US009963540B2

(12) United States Patent
Joy et al.

(10) Patent No.: US 9,963,540 B2
(45) Date of Patent: May 8, 2018

(54) DENSELY FUNCTIONALIZED POLYMERS DERIVED FROM BAYLIS-HILLMAN ADDUCTS

(71) Applicants: Abraham Joy, Copley, OH (US); Chao Peng, Akron, OH (US)

(72) Inventors: Abraham Joy, Copley, OH (US); Chao Peng, Akron, OH (US)

(73) Assignee: The University of Akron, Akron, OH (US)

( * ) Notice: Subject to any disclaimer, the term of this patent is extended or adjusted under 35 U.S.C. 154(b) by 42 days.

(21) Appl. No.: 14/776,006

(22) PCT Filed: Mar. 14, 2014

(86) PCT No.: PCT/US2014/027967
§ 371 (c)(1),
(2) Date: Sep. 14, 2015

(87) PCT Pub. No.: WO2014/152850
PCT Pub. Date: Sep. 25, 2014

(65) Prior Publication Data
US 2016/0002389 A1   Jan. 7, 2016

Related U.S. Application Data

(60) Provisional application No. 61/781,888, filed on Mar. 14, 2013.

(51) Int. Cl.
C08G 18/83 (2006.01)
C08G 18/67 (2006.01)
(Continued)

(52) U.S. Cl.
CPC ......... *C08G 18/835* (2013.01); *C08G 18/244* (2013.01); *C08G 18/34* (2013.01);
(Continued)

(58) Field of Classification Search
CPC .... C08G 18/835; C08G 18/244; C08G 18/34; C08G 18/3868; C08G 18/67; C08G 18/73; C08G 63/6886
See application file for complete search history.

(56) References Cited

U.S. PATENT DOCUMENTS 4,889,948 A    2/1989 Mathias et al.
2005/0112495 A1  5/2005 Feiring et al.
(Continued)

OTHER PUBLICATIONS

Basavaiah et al., The Baylis-Hillman Reaction: A Novel Carbon-Carbon Bond Forming Reaction•, Tetrahedron, 1996, vol. 52, No. 24, pp. 8001-8062. (Retrieved from: http://www.sciencedirect.com/science/article/pli/0040402096001548), Eq-13; p. 8010, para 2.
(Continued)

Primary Examiner — Michael L Leonard
(74) Attorney, Agent, or Firm — Renner Kenner Greive Bobak Taylor & Weber

(57) ABSTRACT

A method of preparing a polymer is provided comprising preparing a Baylis-Hillman adduct by reacting an activated alkene with a carbon electrophile; and polymerizing the Baylis-Hillman adduct. The Baylis-Hillman reaction provides an efficient platform for the synthesis of densely functionalized monomers, from which polymers with multiple functional groups can be readily synthesized. It has been discovered that that Baylis-Hillman adducts are versatile monomers for both controlled radical and step-growth polymerizations.

16 Claims, 18 Drawing Sheets

(51) Int. Cl.
  *C08G 18/73* (2006.01)
  *C08G 18/24* (2006.01)
  *C08G 18/34* (2006.01)
  *C08G 18/38* (2006.01)
  *C08G 63/688* (2006.01)

(52) U.S. Cl.
  CPC ......... *C08G 18/3868* (2013.01); *C08G 18/67* (2013.01); *C08G 18/73* (2013.01); *C08G 63/6886* (2013.01); *C08K 2201/011* (2013.01)

(56) References Cited

U.S. PATENT DOCUMENTS

| | | |
|---|---|---|
| 2007/0021521 A1 | 1/2007 | Cheng et al. |
| 2007/0135556 A1 | 6/2007 | Schwalm et al. |
| 2009/0253805 A1 | 10/2009 | Hoyle et al. |
| 2013/0046052 A1 | 2/2013 | Armes et al. |

OTHER PUBLICATIONS

Peng et al. 'Baylis-Hillman reaction as a versatile platform for the synthesis of diverse functionalized polymers by chain and step polymerization', Macromolecules, 47 (4), pp. 1258-1268, Feb. 5, 2014 (Feb. 5, 2014), available from internet (URL: http://pubs.acs.org/doi/abs/1 0.1 021/ma402541), entire document.

DENSELY FUNCTIONALIZED POLYMERS DERIVED FROM BAYLIS-HILLMAN ADDUCTS

CROSS-REFERENCE TO RELATED APPLICATIONS

This application is a National Stage application of International Application No. PCT/US2014/027967, filed Mar. 14, 2014, which claims priority to U.S. Provisional Patent Application No. 61/781,888, filed Mar. 14, 2013, both of which are incorporated herein by reference.

FIELD OF THE INVENTION

One or more embodiments provides polymers and methods of preparing the polymers by first preparing a Baylis-Hillman adduct and then polymerizing the adduct.

BACKGROUND OF THE INVENTION

Polymer properties are modulated by the presence of various functional groups and the design and synthesis of functionalized polymers is an area of research that is witnessing rapid advances. Currently, the assimilation of synthetic organic methodologies into the design of polymers has provided remarkable examples of precisely engineered polymers such as polyacrylates and polynorbornenes, polyesters, and polyurethanes with various functional groups. Different designs of functionalized polymers have been reported including pendant, chain end functionalized, graft, and hyperbranched polymers. Functionalized polymers have demonstrated several advantages over their non-functionalized counterparts, such as tailored physical, mechanical, and biological properties. For example, the antifouling nature of polyacrylonitrile membranes is improved by functionalization with hydroxyl or carboxyl functionalities. Cell attachment and proliferation onto polymeric substrates are improved by functionalization with the RGD tripeptide.

Presently, there exists a need to easily prepare functional and multifunctional monomers that may be used to prepare densely functionalized monomers.

SUMMARY OF THE INVENTION

One or more embodiments provides a method of preparing a polymer comprising: preparing a diol funtionalized Baylis-Hillman adduct by performing a Baylis-Hillman reaction on an activated alkene and a carbon electrophile, and polymerizing the diol functionalized Baylis-Hillman adduct through a step-growth polymerization.

One or more embodiments also provides a polymer defined by the formula

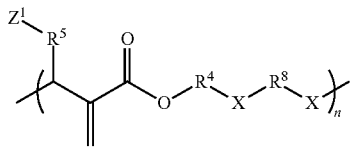

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; each X is an ester or urethane group; and n is about 10 to 100 units.

One or more embodiments also provides a polymer defined by the formula:

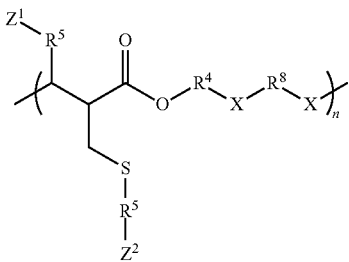

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; and $Z^2$ is a hydrogen atom, aryl group, protected amine, protected carboxylic acid, alkoxy, silyloxy, hydroxyl, protected diol, amine, carboxylic acid, or diol; each X is an ester or urethane group; and n is about 10 to 100.

One or more embodiments also provides a method of preparing a polymer comprising:performing a Baylis-Hillman reaction on an activated alkene and a carbon electrophile to prepare a Baylis-Hillman adduct defined by the formula:

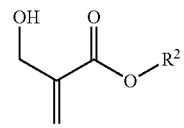

where R2 is selected from hydrogen atoms, alkyl groups, and substituted alkyl groups; and polymerizing the Baylis-Hillman through reversible addition-fragmentation chain-transfer polymerization.

One or more embodiments also provides a method of preparing a nanoparticle comprising: preparing a Baylis-Hillman adduct; preparing a polymers by polymerizing the Baylis-Hillman adduct through radical polymerization; introducing the polymer and solvent into water.

DETAILED DESCRIPTION OF ILLUSTRATIVE EMBODIMENTS

Figure 1:
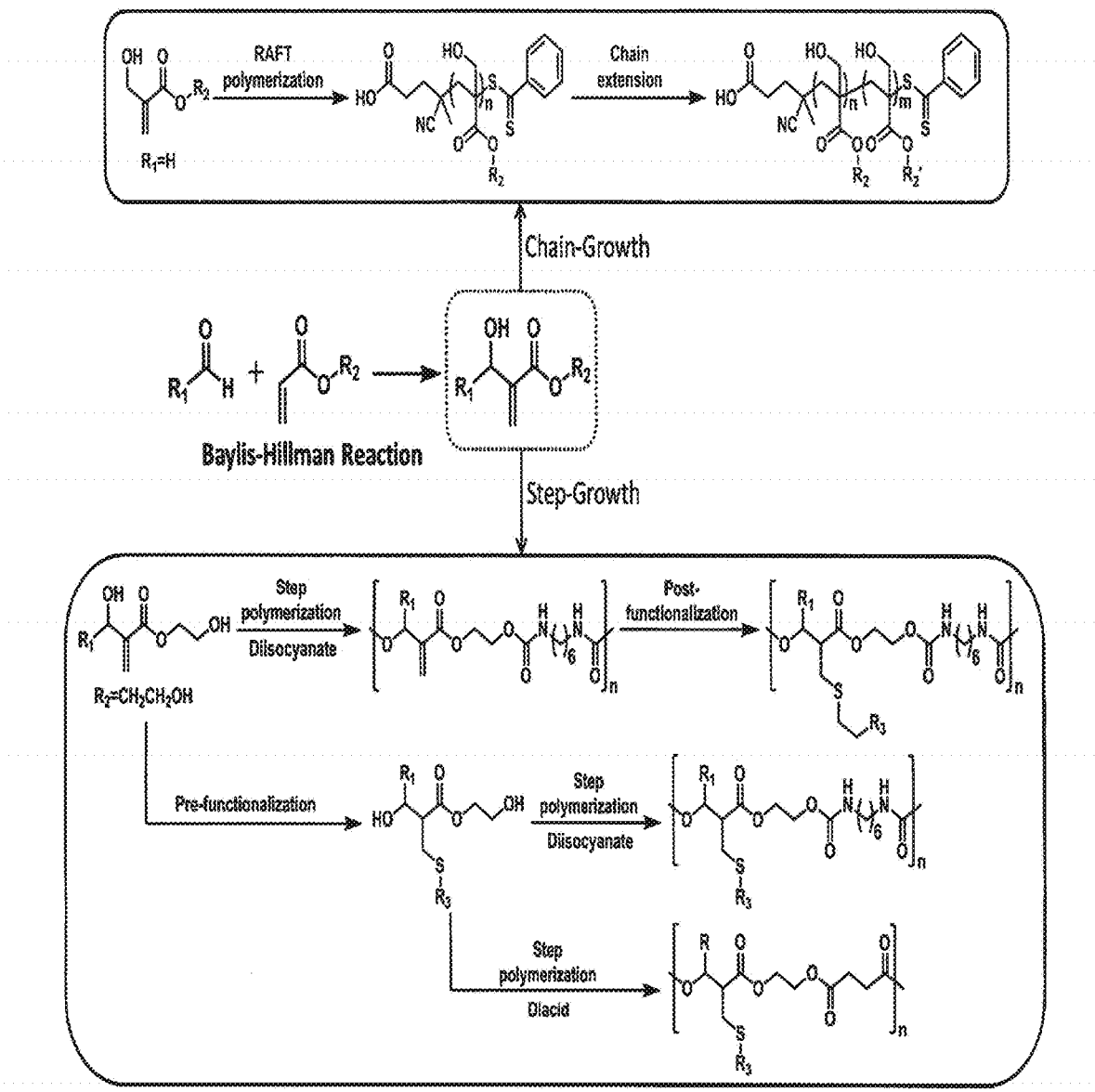
FIG. 1 provides a scheme for preparing Baylis-Hillman based monomers for chain and step-growth polymerizations.

According to one or more embodiments, a method of preparing a polymer is provided comprising preparing a Baylis-Hillman adduct by reacting an activated alkene with a carbon electrophile; and polymerizing the Baylis-Hillman adduct.

The Baylis-Hillman reaction provides an efficient platform for the synthesis of densely functionalized monomers, from which polymers with multiple functional groups can be readily synthesized. It has been discovered that that Baylis-Hillman adducts are versatile monomers for both controlled radical and step-growth polymerizations.

The Baylis-Hillman reaction is a carbon-carbon bond forming reaction between a carbon electrophile and an activated alkene in presence of a tertiary amine. Advantageously, the Baylis-Hillman reaction may be used to produce densely functionalized molecules. The Baylis-Hillman reaction may be performed as a one-pot process.

Suitable tertiary amines for use in the Baylis-Hillman reaction include, but are not limited to, DABCO (1,4-diazabicyclo[2.2.2]octane), Quinuclidine, 3-hydroxyquinuclidine, 3-quinuclidone, indolizine, and triethylamine.

Suitable solvent conditions or systems for performing the Baylis-Hillman reaction include but are not limited to neat, dioxane/water, tetrahydrofuran (THF)/water.

In one or more embodiments, the method of preparing a polymer comprises performing a Baylis-Hillman reaction on an activated alkene and a carbon electrophile to prepare a diol funtionalized Baylis-Hillman adduct, and polymerizing the diol functionalized Baylis-Hillman adduct through a step growth polymerization. In one or more embodiments, a diol functionalized Baylis-Hillman adduct may be defined by the formula:

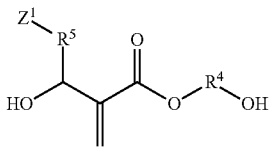

where $R^4$ is a hydrocarbon group; $R^5$ is a bond or a hydrocarbon group; and $Z^1$ is hydrogen, protected amine, protected carboxylic acid, protected hydroxyl, alkoxy, or silyloxy group. In these or other embodiments, the diol functionalized Baylis-Hillman adduct may be the reaction production of the reactants:

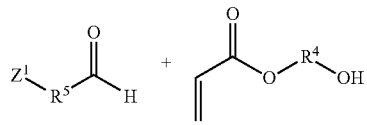

where $R^4$ is a hydrocarbon group; $R^5$ is a bond or a hydrocarbon group; and $Z^1$ is hydrogen, protected amine, protected carboxylic acid, protected hydroxyl, alkoxy, or silyloxy group.

Suitable hydrocarbon groups for Baylis-Hillman adducts include linear, cyclic, aryl, or branched hydrocarbon groups. In one or more embodiments, the hydrocarbon group that includes 1 to 8 carbons, in other embodiments, from 2 to 6 carbons, and in yet other embodiments, from 2 to 4 carbons.

In one or more embodiments, the Baylis-Hillman adduct may be modified prior to polymerization. Examples of modifications include, but are not limited to, the addition of functional groups and the protection of functional groups. For ease of explanation, modified Baylis-Hillman adducts may be referred to as Baylis-Hillman adducts.

In one or more embodiments, the Baylis-Hillman adduct may be modified prior to polymerization through the addition of a functional group through a thiol-ene reaction. The thiol-ene reaction provides the addition of a sulfur-hydrogen bond across the carbon-carbon double bond of the Baylis-Hillman adduct. The thiol-ene reaction allows a functional group to be added by reacting a thiol compound defined by the formula $Z^2$—$R^5$—SH, where $R^5$ is independently a bond or a hydrocarbon group, and $Z^2$ is a hydrogen atom, protected amine, protected carboxylic acid, alkoxy, or silyloxy, hydroxyl, protected diol or aryl group, with carbon-carbon double bond of the Baylis-Hillman adduct. The ratio of the carbon-carbon double bonds of the Baylis-Hillman adduct to the thiol compound may be about 1:5 to about 1:10.

In one or more embodiments, the thiol-ene reaction may be initiated photochemically by irradiating a photoinitiator in the presence of the Baylis-Hillman adduct and a thiol compound. For example, the thiol-ene reaction may be initiated photochemically by irradiating a photoinitiator such as 2-hydroxy-4'-(2-hydroxyethoxy)-2-methylpropiophenone (available as Irgacure 2959 from BASF) at 350 nm. In other embodiments, the thiol-ene reaction may be initiated by using a thermal initiator. In these or other embodiments, the thiol-ene reaction may be initiated by heating the reactants to 80° C. In these or other embodiments, a diol functionalized Baylis-Hillman adduct may be defined by the following formula:

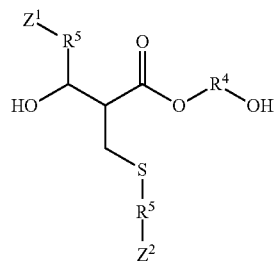

where $R^4$ is a hydrocarbon groups; each $R^5$ is independently a bond or a hydrocarbon group; $Z^1$ is hydrogen, protected amine, protected carboxylic acid, protected hydroxyl, alkoxy, or silyloxy group; and $Z^2$ is a hydrogen atom, protected amine, protected carboxylic acid, alkoxy, or silyloxy, hydroxyl group, protected diol or aryl group.

In one or more embodiments, the Baylis-Hillman adduct may be modified prior to polymerization through the addition of a substituent with a primary alcohol group. For example, by reaction of the secondaryalcohol with 3-bromo-1-propanol or by conversion of the OH group to OTosyl which can then be displaced by another nucleophile containing a primary alcohol. In these or other embodiments, the Baylis-Hillman adduct may be defined by the following formula:

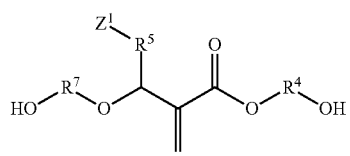

where $R^4$ is a hydrocarbon groups; $R^5$ is a bond or a hydrocarbon group; $R^7$ hydrocarbon group; and $Z^1$ is hydrogen, protected amine, protected carboxylic acid, protected hydroxyl, alkoxy, or silyloxy group.

In one or more embodiments, the step-growth polymerization may take place by reacting a diol functionalized Baylis-Hillman adduct with a co-monomer. Suitable co-monomers include, but are not limited to dicarboxylic acids and diisocyanates. In one or more embodiments, the amount of the co-monomer employed can be described with reference to the diol functionalized Baylis-Hillman adduct. For example, the molar ratio of the co-monomer to the Baylis-Hillman adduct with two alcohol groups may be from about 1:1.

In one or more embodiments, the diol functionalized Baylis-Hillman adduct may be reacted with a dicarboxylic acid group to prepare a polyester. In these or other embodiments, diol functionalized Baylis-Hillman adduct may undergo a reaction prior to polymerization, such as a thiol-ene reaction, to functionalize the carbon-carbon double. In one or more embodiments, a polyester may be formed by reacting a dicarboxylic acid and a diol functionalized Baylis-Hillman adduct in the presence of a polyesterification catalyst such as 4-(N,N-dimethylamino)pyridinium-4-toluenesulfonate catalyst in dichloromethane and N,N-diisopropylcarbodiimide. The resultant polyester may be precipitated with alcohols or other non-solvents.

In one or more embodiments, the dicarboxylic acid may be defined by the formula:

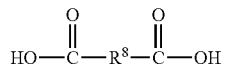

where $R^8$ is a hydrocarbon group. Suitable hydrocarbon groups for dicarboxylic acids include linear, cyclic, branched hydrocarbon groups or aromatic groups. In one or more embodiments, the hydrocarbon group is from 2 to 8 carbon atoms, in other embodiments, from 2 to 6 carbon atoms, and in yet other embodiments from 2 to 4 carbons.

Suitable dicarboxylic acid compounds include, but are not limited to, those selected from the group consisting of succinic acid, glutaric acid, adipic acid, pimelic acid, suberic acid, sebacic acid, protected glutamic acids, such as Boc-Glu-OH, protected aspartic acids, such as Boc-Asp-OH, terepthalic acid, pthalic acid and isopthalic acid.

In one or more embodiments, the diol functionalized Baylis-Hillman adduct may be reacted with a diisocyanate to prepare a polyurethane. While the term polyurethane is used, those skilled in the art will appreciate that the diol functionalized Baylis-Hillman adduct may contain an ester group. When the Baylis-Hillman adduct with two alcohol groups contains an ester group the resultant polyurethane may be referred to as a poly(ester-urethane). For simplicity the term polyurethane will include poly(ester-urethane).

In one or more embodiments, a polyurethane may be formed by reacting a diisocyanate and a diol functionalized Baylis-Hillman adduct with a step growth polymerization catalyst such as a Sn(II)octoate or a Sn(II) 2-ethylhexanoate catalyst in N,N-dimethylformamide, dichloromethane, THF or other suitable solvent. The resultant polyurethane may be precipitated with ether or other non-solvents.

In one or more embodiments, the diisocyante may be defined by the formula:

$$O=C=N-R^8-N=C=O$$

where $R^8$ is a hydrocarbon group. Suitable hydrocarbon diisocyantes include linear hydrocarbon, cyclic hydrocarbon, branched hydrocarbon groups, or aromatic groups. In one or more embodiments, the hydrocarbon group if from 4 to 10 carbon atoms, in other embodiments, from 6 to 8 carbon atoms, and in yet other embodiments about 6 carbons.

Suitable diisocyante compounds include but are not limited to, those selected from the group consisting of hexamethylene diisocyanate and 4-methyl-1,3-phenylene diisocyanate, 4,4'-methylenebis(phenyl isocyanate) and tolylene-2,4-diisocyanate.

In one or more embodiments, the polymer prepared with a Baylis-Hillman adduct may be modified post-polymerization. Examples of modifications include, but are not limited to, the removal of protecting groups and the addition of functional groups.

In one or more embodiments, the polymers prepared with a Baylis-Hillman adduct may be modified post-polymerization through the addition of a functional group through a thiol-ene reaction. Because the functional group added through the thiol-ene reaction no longer needs to withstand the conditions of polymerization, the functional group may be unprotected. In these or other embodiments, the thiol compound defined by the formula $Z^2-R^5-SH$, where $R^5$ is independently a bond or a hydrocarbon group, and $Z^2$ is a hydrogen atom, aryl group, protected amine, protected carboxylic acid, alkoxy, silyloxy, hydroxyl, protected diol, amine, carboxylic acid, or diol, with carbon-carbon double bond of the Baylis-Hillman adduct. The ratio of the carbon-carbon double bonds of the Baylis-Hillman adduct to the thiol compound may be about 1:5 to about 1:10.

In one or more embodiments, the polymer prepared with a Baylis-Hillman adduct may include the formula:

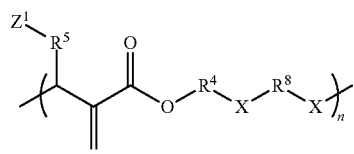

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; each X is an urethane group; and n is about 10 to 100 units.

As previously noted Baylis-Hillman adducts and polymers prepared from Baylis-Hillman adducts may be functionalized through the use of a thiol-ene reaction. In these or other embodiments, the polymer prepared with a Baylis-Hillman adduct includes a thiol-ene functionalization, the polymer may include the formula:

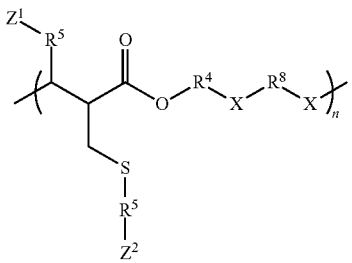

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; and $Z^2$ is a hydrogen atom, aryl group, protected amine, protected carboxylic acid, alkoxy, silyloxy, hydroxyl, diol, amine, carboxylic acid, or diol; each X is an ester or urethane group; and n is about to 100.

As noted above, polymers can be prepared using Baylis-Hillman adducts as monomers through radical polymerization. In these or other embodiments, the method of preparing a polymer comprises performing a Baylis-Hillman reaction on an activated alkene and a carbon electrophile to prepare a Baylis-Hillman adduct defined by the formula:

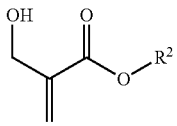

where $R^2$ is selected from hydrogen atoms, alkyl groups, and substituted alkyl groups; and polymerizing the Baylis-Hillman adduct. In these or other embodiments, the Baylis-Hillman adduct may be the reaction production of the reactants:

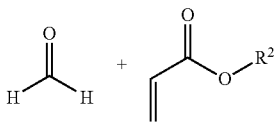

where $R^2$ is selected from hydrogen atoms, alkyl groups, and substituted alkyl groups; and polymerizing the Baylis-Hillman adduct.

Examples of alkyl groups suitable as an $R^2$ include, but are not limited to, -n-butyl, -t-butyl, -n-hexyl, and -2-ethylhexyl.

Examples of substituted alkyl groups suitable as an $R^2$ group include, but are not limited to, —$(CH_2)_x$—NHBoc, —$(CH_2)_x$—COOtBu, —$(CH_2)_x$—OTBDMS, —(CH2)x-N3, —(CH2)x-CECH, where X may be 1 to 6 units.

In one or more embodiments, the Baylis-Hillman adduct is polymerized through conventional radical polymerization. In these or other embodiments, the the polymerization may be initiated by a free radical initiators such as azobisisobutyronitrile (AIBN).

In one or more embodiments, the Baylis-Hillman adduct is polymerized through reversible addition-fragmentation chain-transfer polymerization. In these or other embodiments, the reversible addition-fragmentation chain-transfer polymerization is mediated by a RAFT agent with a thiocarbonylthio group. In one or more embodiments, the RAFT agent with a thiocarbonylthio group defined by the formula:

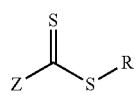

Where R is the free radical leaving group that is capable of reinitiating polymerization and Z is a group that controls C=S bond reactivity. The Z group that controls C=S bond reactivity influences the rate of radical addition and fragmentation. In these or other embodiments, the thiocarbonylthio group of the RAFT agent is a dithioester, dithiocarbamate, trithiocarbonate, or a xanthate group.

Suitable Raft polymerization agents are disclosed in WO 98/01478 and WO 99/31144, which are both incorporatd by reference.

In one or more embodiments, the reversible addition-fragmentation chain-transfer polymerization is mediated by a RAFT agent selected from the group consisting of 2-(Dodecylthiocarbonothioylthio)-2-methylpropionic acid and 2-(Butylthiocarbonothioylthio)-2-methylpropionic acid 4-Cyano-4-(phenylcarbonothioylthio) pentanoic acid.

In one or more embodiment, where the Baylis-Hillman adduct is polymerized through reversible addition-fragmentation chain-transfer polymerization the polymer may be defined by the formula:

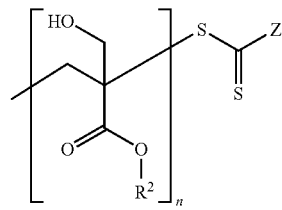

where $R^2$ is selected from hydrogen atoms, alkyl groups, and substituted alkyl groups; and Z a segment of a RAFT agent. A segment of a raft agent may be a group adjacent to the thiocarbonylthio group on a RAFT agent. For example, the group that controls C=S bond reactivity.

In one or more embodiments, Baylis-Hillman adduct is polymerized through conventional radical polymerization or reversible addition-fragmentation chain-transfer polymerization may be used to prepare a nanoparticle. In these or other embodiments, the nanoparticle is prepared by introducing the polymer dissolved in a solvent into water.

In one or more embodiments, the method of preparing a nanoparticle includes introducing a polymer in a solvent into a water, wherein the polymer is defined by the formula:

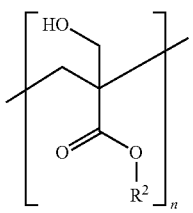

where where $R^2$ is selected from hydrogen atoms, alkyl groups, and substituted alkyl groups and n is about 30 to about 100 units.

In one or more embodiments, the solvent may be an organic solvent. Suitable solvents for dissolving the polymer include, but are not limited to acetone, dimethylformamide, methanol, THF, and dioxane.

In one or more embodiment, the nanoparticle may be prepared by introducing the polymer to water by adding the polymer in a solvent dropwise into water. The water may be stirred vigorously. In other embodiments, the nanoparticle may be prepared by introducing the polymer to water by adding water dropwise to the polymer dissolved in a solvent. In other embodiments, the nanoparticle may be prepared by introducing the polymer to water through dialysis.

In light of the foregoing, it should be appreciated that the present invention significantly advances the art by providing a polymer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Materials.

Tin(II)2-ethylhexanoate, $(Sn(Oct)_2)$, and 2-hydroxy-4'-(2-hydroxyethoxy)-2-methylpropiophenone (Irgacure 2959) were purchased from Sigma-Aldrich. 2-Mercaptoethanol was purchased from TCI. All other reagents were purchased from Alfa Aesar. Unless otherwise stated, all reagents were used as received. 2,2'-Azobis(isobutyronitrile) (AIBN) was recrystallized multiple times from methanol before use. 4-(4-Cyanopentanoic acid) dithiobenzoate (CPDB) and 4-(dimethylamino)pyridinium p-toluenesulfonate (DPTS) were synthesized according to reported procedures.

Analytical Methods.

NMR spectra were recorded on a Varian NMRS 300 or 500 MHz instrument. $^1H$ NMR chemical shifts are reported in ppm relative to the solvent's residual $^1H$ signal. $^{13}C$ NMR spectra were recorded at 125 MHz. Size exclusion chromatography (SEC) analysis in DMF was performed on a HLC-8320 GPC from TOSOH equipped with RI and UV detectors using PMMA or PS as the standards. ESI MS was performed on Bruker HTC ultra QIT. Size exclusion chromatography (SEC) in THF was performed on a Waters 150-C Plus instrument equipped with RI and LS detectors and PS was used as the standard. The decomposition temperature ($T_d$) of the polymers was determined by thermal gravimetric analysis (TGA) using TA Q500 thermal gravimetric analysis instrument. The glass transition temperature ($T_g$) of the polymers was determined by differential scanning calorimetry (DSC) using TA Q2000 differential scanning calorimetry instrument. The morphology of the nanoparticles was characterized by scanning electron microscope (SEM) using JEOL-JSM-7401F with operating voltage as 4 kV. The size and distribution of the nanoparticles were determined by dynamic light scattering (DLS) using a Malvern Instruments Zetasizer Nano ZS.

Synthesis of Alkyl α-Hydroxymethyl Acrylate Monomers.

As an example, the synthesis of 1b(nBu) is as follows: n-butyl acrylate (14.0 g, 0.109 mol), formaldehyde aqueous solution (2.7 mL, 0.036 mol) and 1,4-diazabicyclo[2.2.2]octane (DABCO) (4.1 g, 0.036 mol) were added to a round-bottom flask equipped with a magnetic stir bar. Then 1,4-dioxane (10.0 mL) and distilled water (7.3 mL) were added and the mixture was stirred at room temperature for 12 hours. The compound was extracted by ethyl acetate followed by washing with brine and subsequent drying over anhydrous $Na_2SO_4$. The filtrate was then concentrated under reduced pressure and purified by column chromatography (30% ethyl acetate and 70% hexane, $R_f$=0.5) to give a colorless liquid. (2.9 g, 51%)

1a(Et): $^1H$ NMR (300 MHz, $CDCl_3$) δ (ppm) 1.33 (t, J=7.50 Hz, 3H), 2.23 (t, J=6.00 Hz, 1H), 4.26 (q, J=7.00 Hz, 2H), 4.35 (d, J=3.00 Hz, 2H), 5.83 (s, 1H), 6.27 (s, 1H); $^{13}C$ NMR (125 MHz, $CDCl_3$) δ (ppm) 14.09 (s), 60.80 (s), 62.36 (s), 125.37 (s), 139.59 (s), 166.29 (s). MS(ESI): 152.8 ([M+Na]$^+$).

1b(nBu): $^1H$ NMR (300 MHz, $CDCl_3$) δ (ppm) 0.96 (t, J=7.50 Hz, 3H), 1.36-1.49 (m, 2H), 1.64-1.73 (m, 2H), 2.25 (t, J=6.00 Hz, 1H), 4.20 (t, J=7.50 Hz, 2H), 4.35 (d, J=3.00 Hz, 2H), 5.84 (s, 1H), 6.27 (s, 1H); $^{13}C$ NMR (125 MHz, $CDCl_3$) δ (ppm) 13.62 (s), 19.13 (s), 30.56 (s), 62.41 (s), 64.69 (s), 125.34 (s), 139.61 (s), 166.36 (s). MS(ESI): 180.9 ([M+Na]$^+$).

1c(tBu): $^1H$ NMR (300 MHz, $CDCl_3$) δ (ppm) 1.52 (s, 9H), 2.32 (t, J=6.00 Hz, 1H), 4.30 (d, J=6.00 Hz, 2H), 5.75 (s, 1H), 6.16 (s, 1H); $^{13}C$ NMR (125 MHz, $CDCl_3$) δ (ppm) 28.03 (s), 62.61 (s), 81.31 (s), 124.62 (s), 140.88 (s), 165.65 (s). MS(ESI): 180.9 ([M+Na]$^+$).

1d(nHex): $^1H$ NMR (300 MHz, $CDCl_3$) δ (ppm) 0.90 (t, J=7.50 Hz, 3H), 1.32-1.43 (m, 6H), 1.65-1.74 (m, 2H), 2.26 (s, 1H), 4.19 (t, J=6.00 Hz, 2H), 4.34 (s, 2H), 5.84 (s, 1H), 6.27 (s, 1H); $^{13}C$ NMR (125 MHz, $CDCl_3$) δ (ppm) 13.90 (s), 22.46 (s), 25.57 (s), 28.48 (s), 31.35 (s), 62.46 (s), 65.01 (s), 125.37 (s), 139.61 (s), 166.34 (s). MS(ESI): 208.9 ([M+Na]$^+$).

1e(TBS): $^1H$ NMR (300 MHz, $CDCl_3$) δ (ppm) 0.08 (s, 6H), 0.90 (s, 9H), 2.39 (t, J=3.00 Hz, 1H), 3.86 (t, J=3.00 Hz, 2H), 4.27 (t, J=3.00 Hz, 2H), 4.34 (d, J=6.00 Hz, 2H), 5.84 (s, 1H), 6.28 (s, 1H). $^{13}C$ NMR (125 MHz, $CDCl_3$) δ (ppm) 5.38 (s), 18.25 (s), 25.79 (s), 61.09 (s), 62.63 (s), 66.00 (s), 125.89 (s), 139.47 (s), 166.19 (s). MS(ESI): 283.0 ([M+Na]$^+$).

Synthesis of Poly(alkyl α-hydroxymethyl acrylate) by RAFT Polymerization.

In a typical experiment (entry 2 in Table 1), 1b(nBu) (316.4 mg, 2.0 mmol), the RAFT agent CPDB (9.3 mg, 0.033 mmol), AIBN (1.8 mg, 0.011 mmol) and anhydrous 1,4-dioxane (1.0 mL) were added to a Schlenk flask equipped with a magnetic stir bar. The Schlenk flask was subjected to three freeze-pump-thaw cycles. Then the flask was sealed and placed in a heated oil bath at 70° C. for 24 hours under magnetic stirring. The polymer was precipitated in hexane, centrifuged and dried in vacuum oven to give a pink solid. ($M_n$=8.0 kg/mol, PDI=1.16)

P1a(Et): $^1H$ NMR (500 MHz, Acetone-d6) δ (ppm) 1.30 (m, 3H), 1.95 (m, 2H), 3.74-4.13 (m, 4H), 7.48 (m, end group), 7.62 (m, end group), 7.92 (m, end group).

P1b(nBu): $^1$H NMR (500 MHz, CDCl$_3$) δ (ppm) 0.97 (m, 3H), 1.42 (m, 2H), 1.64 (m, 2H), 1.92 (m, 2H), 3.59-4.07 (m, 4H), 7.36 (m, end group), 7.52 (m, end group), 7.88 (m, end group).

P1c(tBu): $^1$H NMR (500 MHz, CDCl$_3$) δ (ppm) 1.53 (m, 9H), 1.95 (m, 2H), 3.67 (m, 2H), 7.36 (m, end group), 7.51 (m, end group), 7.90 (m, end group).

P1d(nHex): $^1$H NMR (500 MHz, CDCl$_3$) δ (ppm) 1.53 (m, 9H), 1.95 (m, 2H), 3.67 (m, 2H), 7.36 (m, end group), 7.51 (m, end group), 7.90 (m, end group).

Synthesis of Block Copolymer, P1b(nBu)-b-P1e(TBS), by RAFT Polymerization (Entry 10 in Table 1)

P1b(nBu) (192.2 mg, 2.4×10$^{-5}$ mol), AIBN (1.3 mg, 8.0×10$^{-6}$ mol), 1e(TBS) (374.5 mg, 1.438×10$^{-3}$ mol) and anhydrous 1,4-dioxane (1.0 mL) were added to a Schlenk flask equipped with a magnetic stir bar. The Schlenk flask was subjected to three freeze-pump-thaw cycles. The flask was then sealed and placed in a heated oil bath at 70° C. for 24 hours under magnetic stirring. The polymer was precipitated in cold hexane, centrifuged and dried in vacuum oven to give a pink solid. ($M_n$=24.1 kg/mol, PDI=1.25)

P1b(nBu)-b-P1e(TBS): $^1$H NMR (500 MHz, CDCl$_3$) δ (ppm) 0.10 (m, 6H), 0.92 (m, 9H), 0.97 (m, 3H), 1.42 (m, 2H), 1.64 (m, 2H), 1.92 (m, 4H), 3.59-4.07 (m, 8H)

Preparation of Nanoparticles by Dialysis Method.

P1b(nBu) (entry 2 in Table 1, $M_n$=8.0 kg/mol, PDI=1.16) was dissolved in DMF at a concentration of 1.0 mg/mL and dialyzed against distilled water for 24 hours. The water was refreshed every six hours. Morphology and size of the nanoparticles were investigated by SEM and DLS.

Preparation of Nanoparticles by the Dropping Method

P1b(nBu) (entry 2 in Table 1, $M_n$=8.0 kg/mol, PDI=1.16) was dissolved in acetone at a concentration of 1.0 mg/mL, and distilled water was added dropwise to the polymer solution under vigorous stirring until the solution became faint blue. The morphology of the nanoparticles was characterized by SEM.

Synthesis of Alkene-Functionalized Diol.

As an example, the synthesis of 2b(Ph) is as follows: 2-hydroxyethyl acrylate (6.0 g, 0.052 mol), 3-phenylpropionaldehyde (2.3 g, 0.017 mol) and 1,4-diazabicyclo[2.2.2]octane (5.8 g, 0.052 mol) were added to a round-bottom flask equipped with a magnetic stir bar. Then 1,4-dioxane (8.0 mL) and distilled water (8.0 mL) were added to the flask and the mixture was stirred at room temperature for 24 hours. The compound was extracted by ethyl acetate followed by washing with brine and subsequent drying over anhydrous Na$_2$SO$_4$. The filtrate was then concentrated under reduced pressure and purified by column chromatography (30% ethyl acetate and 70% hexane, $R_f$=0.3) to give a colorless liquid. (1.8 g, 43%)

2a(Pr): $^1$H NMR (300 MHz, CDCl$_3$) δ (ppm) 0.96 (t, J=7.50 Hz, 3H), 1.32-1.54 (m, 2H), 1.62-1.70 (m, 2H), 2.00 (s, 1H), 2.51 (s, 1H), 3.90 (t, J=4.50 Hz, 2H), 4.34 (t, J=4.50 Hz, 2H), 4.44 (t, J=6.00 Hz, 1H), 5.84 (s, 1H), 6.28 (s, 1H); $^{13}$C NMR (125 MHz, CDCl$_3$) δ (ppm) 13.79 (s), 18.97 (s), 38.15 (s), 60.80 (s), 66.27 (s), 71.11 (s), 125.26 (s), 142.60 (s), 166.77 (s). MS(ESI): 210.9 ([M+Na]$^+$).

2b(Ph): $^1$H NMR (300 MHz, CDCl$_3$) δ (ppm) 1.96-2.05 (m, 2H), 2.67-2.89 (m, 2H), 3.87 (t, J=6.00 Hz, 2H), 4.32 (t, J=4.50 Hz, 2H), 4.66 (t, J=7.50 Hz, 1H), 5.86 (s, 1H), 6.30 (s, 1H), 7.18-7.32 (m, 5H); $^{13}$C NMR (125 MHz, CDCl$_3$) δ (ppm) 31.95 (s), 37.47 (s), 60.69 (s), 66.25 (s), 70.50 (s), 125.58 (s), 128.83 (s), 128.32 (s), 128.38 (s), 141.53 (s), 142.39 (s), 166.64 (s). MS(ESI): 273.0 ([M+Na]$^+$).

General Procedure of the Thiol-Ene "Click" Reaction of the Alkene-Functionalized Diols.

As an example, the synthesis of 2b(Ph)-Dodecyl is as follows: 2b(Ph) (1.0 g, 4 mmol), 1-dodecanethiol (8.1 g, 40 mmol), Irgacure 2959 (448.6 mg, 2 mmol) and anhydrous DMF (3.6 mL) were added to a quartz glass test tube. The solution was irradiated at 350 nm for 30 minutes. The product was purified by column chromatography (50% ethyl acetate and 50% hexane, $R_f$=0.3) to give a colorless liquid. (1.5 g, 83%)

2a(Pr)-nBu: $^1$H NMR (300 MHz, MeOD) δ (ppm) 0.93 (t, J=7.5 Hz, 6H), 1.31-1.61 (m, 8H), 2.54 (t, J=7.5 Hz, 2H), 2.66-2.95 (m, 3H), 3.71-3.80 (m, 3H), 4.18 (m, 2H). $^{13}$C NMR (125 MHz, Acetone-d6) δ (ppm) 13.99 (s), 14.32 (s), 19.69 (s), 22.57 (s), 31.12 (s), 32.51 (s), 37.85 (s), 38.15 (s), 54.59 (s), 60.85 (s), 66.71 (s), 72.33 (s), 173.86 (s). MS(ESI): 301.0 ([M+Na]$^+$).

2b(Ph)-Dodecyl: $^1$H NMR (300 MHz, MeOD) δ (ppm) 0.90 (t, J=7.5 Hz, 3H), 1.29-1.37 (m, 18H), 1.55 (m, 2H), 1.70-1.90 (m, 2H), 2.51 (t, J=7.5 Hz, 2H), 2.63-2.90 (m, 5H), 3.71-3.81 (m, 3H), 4.18 (m, 2H), 7.21 (m, 5H). $^{13}$C NMR (125 MHz, CDCl$_3$) δ (ppm) 22.68 (s), 28.84 (s), 29.20 (s), 29.34 (s), 29.46 (s), 29.51 (s), 29.59 (s), 29.64 (s), 31.61 (s), 31.91 (s), 32.03 (s), 32.12 (s), 32.65 (s), 36.08 (s), 37.38 (s), 51.28 (s), 60.84 (s), 66.27 (s), 71.50 (s), 126.03 (s), 128.44 (s), 128.49 (s), 143.89 (s), 173.81 (s). MS(ESI): 475.2 ([M+Na]$^+$).

Synthesis of Poly(ester urethane)s.

In a typical reaction (entry 2 in Table 3), 2b(Ph) (0.6554 g, 2.62 mmol) and hexamethylene diisocyanate (0.4407 g, 2.62 mmol) were added to a Schlenk flask. The flask was evacuated and backfilled with nitrogen three times. Then anhydrous dichloromethane (3.0 mL) was added. After that one drop of Sn(Oct)$_2$ was added under N$_2$ and the solution was stirred at room temperature for 48 hours. The product was precipitated in diethyl ether, centrifuged and dried in vacuum oven. ($M_n$=9.4 kg/mol, PDI=1.47)

PEU2a(Pr): $^1$H NMR (300 MHz, CDCl$_3$) δ (ppm) 0.92 (t, J=7.5 Hz, 3H), 1.35-1.65 (m, 12H), 3.17 (m, 5H), 4.30 (m, 4H), 4.93 (br, 2H), 5.51 (s, 1H), 5.78 (s, 1H), 6.29 (s, 1H).

PEU2b(Ph): $^1$H NMR (300 MHz, CDCl$_3$) δ (ppm) 1.33-1.64 (m, 8H), 1.98-2.10 (m, 2H), 2.67 (m, 2H), 3.14 (m, 4H), 4.28 (m, 4H), 4.84 (br, 2H), 5.56 (s, 1H), 5.81 (s, 1H), 6.32 (s, 1H), 7.18 (m, 3H), 7.25 (m, 2H).

PEU2a(Pr)-nBu: $^1$H NMR (300 MHz, CDCl$_3$) δ (ppm) 0.91 (m, 6H), 1.28-1.65 (m, 16H), 2.51 (m, 2H), 2.69 (m, 1H), 2.85 (m, 2H), 3.16 (s, 4H), 4.23-4.32 (m, 4H), 5.02 (s, 1H).

PEU2b(Ph)-Dodecyl: $^1$H NMR (300 MHz, CDCl$_3$) δ (ppm) 0.89 (m, 3H), 1.26-1.63 (m, 28H), 1.92 (m, 2H), 2.48 (m, 2H), 2.67 (m, 3H), 2.86 (m, 2H), 3.14 (m, 4H), 4.22-4.31 (m, 4H), 5.08 (m, 1H), 7.19-7.30 (m, 5H).

Synthesis of Polyesters.

In a typical reaction (entry 2 in Table 6), 2b(Ph)-Dodecyl (1.0275 g, 2.27 mmol), succinic acid (0.2681 g, 2.27 mmol), and DPTS (0.2657 g, 0.91 mmol) were added to a Schlenk flask. The flask was evacuated and backfilled with nitrogen three times. Anhydrous dichloromethane (4.3 mL) was added followed by diisopropylcarbodiimide (DIC) (0.8581 g, 6.81 mmol) and the reaction was stirred at room temperature for 24 hours. The polymer was precipitated in methanol three times to give a viscous liquid. ($M_n$=8.3 kg/mol, PDI=1.34)

PE2a(Pr)-nBu: $^1$H NMR (300 MHz, CDCl$_3$) δ (ppm) 0.92 (t, J=7.5 Hz, 6H), 1.29-1.64 (m, 8H), 2.52 (m, 2H), 2.62-2.91 (m, 7H), 4.33 (m, 4H), 5.19 (m, 1H).

PE2b(Ph)-Dodecyl: $^1$H NMR (300 MHz, CDCl$_3$) δ (ppm) 0.89 (t, J=6.0 Hz, 3H), 1.20-1.33 (m, 18H), 1.55 (m, 2H), 1.95 (m, 2H), 2.45-2.83 (m, 8H), 2.92 (m, 1H), 4.29 (m, 4H), 5.24 (m, 1H), 7.15-7.33 (m, 5H).

General Procedure for the Thiol-Ene "Click" Reaction of the Alkene-Functionalized Polymers.

In a typical experiment (entry 4 in Table 4), PEU2b(Ph) (0.1 g) and 3-mercaptopropionic acid (0.25 g, 2.4 mmol), Irgacure 2959 (26.9 mg, 0.12 mmol) and anhydrous chloroform (1.0 mL) were added to a quartz glass test tube. The solution was irradiated at 350 nm for 30 minutes. The product was precipitated in diethyl ether, centrifuged and dried in a vacuum oven.

PEU2a(Pr)-OH: $^1$H NMR (300 MHz, MeOD) δ (ppm) 0.93 (t, J=7.5 Hz, 3H), 1.35-1.61 (m, 12H), 2.66 (m, 2H), 2.78-2.90 (m, 3H), 3.10 (m, 4H), 3.68 (t, J=7.5 Hz, 2H), 4.26-4.31 (m, 4H), 5.01 (m, 1H).

PEU2a(Pr)-COOH: $^1$H NMR (300 MHz, DMSO-d6) δ (ppm) 0.85 (t, J=6.0 Hz, 3H), 1.22-1.50 (m, 12H), 2.63-2.84 (m, 7H), 2.95 (m, 4H), 4.13-4.21 (m, 4H), 4.89 (m, 1H), 6.99-7.11 (m, 2H), 12.24 (s, 1H).

PEU2b(Ph)-OH: $^1$H NMR (300 MHz, MeOD) δ (ppm) 1.34-1.50 (m, 8H), 1.93 (m, 2H), 2.65 (m, 4H), 2.76-2.96 (m, 3H), 3.09 (m, 4H), 3.65 (t, J=7.5 Hz, 2H), 4.23-4.28 (m, 4H), 5.02 (m, 1H), 7.16-7.28 (m, 5H).

PEU2b(Ph)-COOH: $^1$H NMR (300 MHz, DMSO-d6) δ (ppm) 1.23-1.38 (m, 8H), 1.83 (m, 2H), 2.44-2.67 (m, 9H), 2.94 (m, 4H), 4.12-4.19 (m, 4H), 4.89 (m, 1H), 7.08 (m, 2H), 7.17-7.26 (m, 5H), 12.23 (s, 1H).

Monomer Synthesis.

Figure 2:
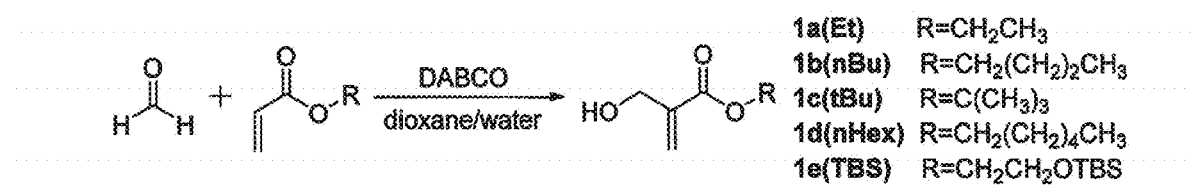
FIG. 2 provides a scheme for the synthesis of alkyl α-hydroxymethyl acrylate monomers.
Figure 3:
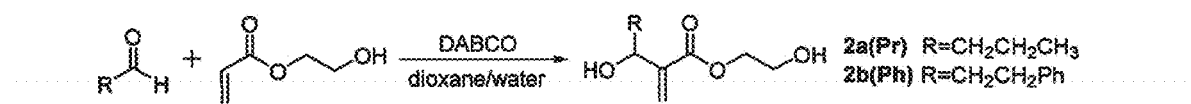
FIG. 3 provides a scheme for the synthesis alkene functionalized diols

The two types of monomers used for the polymerizations were synthesized using a one-step Baylis-Hillman reaction as outlined in FIG. 2 and FIG. 3. The Baylis-Hillman reaction of formaldehyde with alkyl acrylate in the presence of DABCO generated alkyl α-hydroxymethyl acrylate (1a-1e) and the reaction of aldehyde with 2-hydroxyethyl acrylate in the presence of DABCO provided the unsaturated diol (2a(Pr) and 2b(Ph)) in approximately 50% yield for both reactions.

The Baylis-Hillman reaction to give 1 (a-e) and 2 (a, b) was carried out in a 1,4-dioxane/water (1/1, v/v) medium as it has been reported to accelerate the progress of the reaction.[54] As representative examples, the 300 MHz $^1$H NMR spectrum of 1b(nBu) and 2b(Ph) is shown in FIG. 2.

Synthesis of the α-Hydroxymethyl Substituted Polyacrylate Library by RAFT Polymerization.

Figure 4:
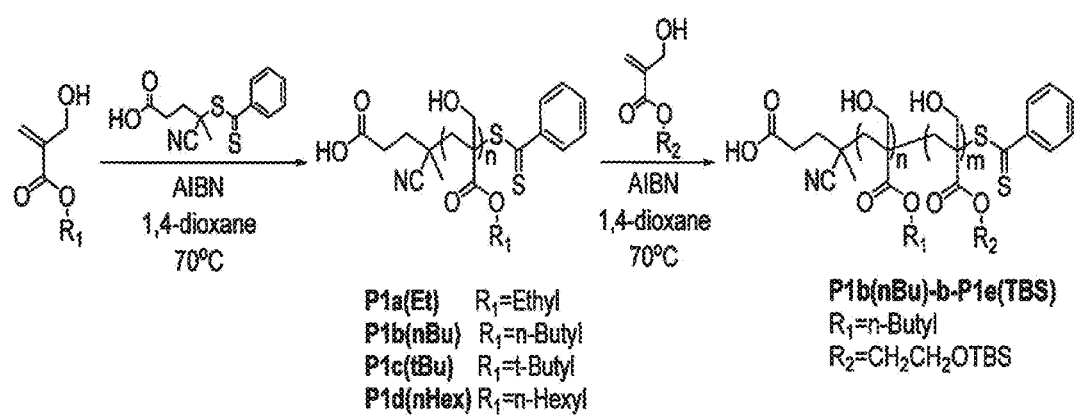
FIG. 4 provides a scheme for the synthesis of poly(alkyl α-hydroxymethyl acrylate) via RAFT polymerization.

A library of α-hydroxymethyl substituted polyacrylates was synthesized using RAFT polymerization (FIG. 4). Within this series, the pendant groups of the polymers were varied, such as ethyl, n-butyl, t-butyl or n-hexyl. The homopolymers were synthesized by RAFT polymerization at 70° C. using AIBN as initiator. 4-(4-Cyanopentanoic acid) dithiobenzoate, CPDB, was selected as the chain transfer agent to control the polymerization as it was found to be compatible with the α-hydroxymethyl substituted acrylate monomers. The structures of the polymers were confirmed by $^1$H NMR spectroscopy. A typical example is shown in FIG. 3 (entry 2 in Table 1) with the proton assignments corresponding to the repeating unit. As shown in the expanded region of the spectrum between 7.2 and 8.0 ppm, the signals of the RAFT end group were detected around 7.38, 7.54 and 7.98 ppm, which confirmed the retained RAFT end group. In order to calculate the monomer conversion, aliquots of the reaction mixture were withdrawn by syringe at the end of the reaction and analyzed by $^1$H NMR spectroscopy. The conversion was determined by integration of the backbone methylene proton resonances $I(-CH_2)^p$ relative to the monomer olefinic proton resonances $I(=CH_2)^m$ by Eq. 1. Theoretical number-average molecular weights were calculated based on Eq. 2, where $MW_{CTA}$ and $MW_m$ are the molecular weights of RAFT agent and monomer, respectively. $[M]_0$ and $[CTA]_0$ are the initial concentrations of monomer and RAFT agent, respectively. The theoretical molecular weight shows good agreement with the experimental molecular weight.

$$\text{Conversion}(\%) = \frac{I(-CH_2)^p}{I(-CH_2)^p + I(=CH_2)^m} \times 100\% \quad \text{Eq. 1}$$

$$M_n^{calc} = \frac{[M]_0 \times MW_m \times \text{Conversion}}{[CTA]_0} + MW_{CTA} \quad \text{Eq. 2}$$

Table 1 summarizes the results for the polymers prepared by RAFT polymerization as obtained from the SEC and $^1$H NMR data. It is shown that high $[M]_0/[CTA]_0$ molar ratio such as 200:1 or 220:1 afforded a molecular weight between 11.7 and 29.6 kg/mol. With a low $[M]_0/[CTA]_0$ molar ratio 60:1, relatively low molecular weight between 5.4 and 9.6 kg/mol was obtained. SEC analysis indicated unimodal molecular weight distributions and the $M_w/M_n$ was around 1.2. It is worth noting that slightly broader polydispersity was observed for the polymer with a tert-butyl pendant group, which may be due to the steric hindrance of the monomer or potential side reactions that may occur with tert-butyl moieties via thermal pathways.

TABLE 1

Synthesis of α-Hydroxymethyl Substituted Polyacrylates via RAFT Polymerization

| entry | polymer | $[M]_0/[CTA]_0/[I]_0$ | $[M]_0$ (mol L$^{-1}$) | Time (h) | $M_{n,SEC}$ (kg/mol)$^b$ | PDI$^b$ | Conv. (%)$^c$ | $M_{n,theory}$ (kg/mol)$^d$ |
|---|---|---|---|---|---|---|---|---|
| 1 | P1a(Et) | 180/3/1 | 2 | 24 | 7.6 | 1.15 | 92 | 7.6 |
| 2 | P1b(nBu) | 180/3/1 | 2 | 24 | 8.0 | 1.16 | 80 | 8.0 |
| 3 | P1c(tBu) | 180/3/1 | 2 | 24 | 5.4 | 1.21 | 48 | 5.0 |
| 4 | P1d(nHex) | 180/3/1 | 2 | 24 | 9.6 | 1.16 | 73 | 8.5 |
| 5 | P1a(Et) | 200/1/0.2 | 2 | 24 | 19.8 | 1.18 | 62 | 15.8 |
| 6 | P1b(nBu) | 220/1/0.2 | 2 | 24 | 25.4 | 1.19 | 58 | 20.5 |
| 7 | P1c(tBu) | 200/1/0.2 | 2 | 24 | 11.7 | 1.28 | 41 | 13.2 |
| 8 | P1d(nHex) | 220/1/0.2 | 2 | 24 | 29.6 | 1.17 | 63 | 26.1 |
| 9 | P1b(nBu) | 180/3/1 | 2 | 24 | 10.3$^{b'}$ | 1.07$^{b'}$ | 80 | 8.0 |

TABLE 1-continued

Synthesis of α-Hydroxymethyl Substituted Polyacrylates via RAFT Polymerization

| entry | polymer | $[M]_0/[CTA]_0/[I]_0$ | $[M]_0$ (mol L$^{-1}$) | Time (h) | $M_{n,SEC}$ (kg/mol)$^b$ | PDI$^b$ | Conv. (%)$^c$ | $M_{n,theory}$ (kg/mol)$^d$ |
|---|---|---|---|---|---|---|---|---|
| 10 | P1b(nBu)-b-P1e(TBS) | 180/3/1 | 1.5 | 24 | 24.1$^{b'}$ | 1.25$^{b'}$ | 73 | 19.4 |

$^a$All the experiments (entry 1-10) used AIBN as initiator and 1,4-dioxane as solvent. The reaction temperature was kept at 70° C.
$^b$Determined by SEC using DMF as the eluent and PMMA as the standard.
$^{b'}$Determined by SEC using THF as the eluent and PS as the standard.
$^c$Monomer conversion determined by $^1$H NMR.
$^d$Calculated based on the monomer conversion.

The thermal properties (decomposition temperature ($T_d$) and glass transition temperature ($T_g$)) of the homopolymers were determined by TGA and DSC. The polymers from entry 5-8 (Table 1) were selected for thermal analysis and the results are summarized in Table 2. TGA experiments revealed that the polymers began decomposition at around 152-165° C. and they showed two stages of weight loss (Supporting Information). Based on DSC experiments, the $T_g$ decreases with increasing length of the alkyl side chain. P1b(nBu) ($M_n$=25.4 kg/mol, $T_g$=56° C.) and P1d(nHex) ($M_n$=29.6 kg/mol, $T_g$=28° C.) showed lower glass transition temperatures ($T_g$) than P1a(Et) ($M_n$=19.8 kg/mol, $T_g$=85° C.), which was consistent with the higher flexibility of n-butyl and n-hexyl side groups in P1b(nBu) and P1d (nHex). The polymers with t-butyl and ethyl groups provided similar $T_g$ values; $T_g$ of P1a(Et) ($M_n$=19.8 kg/mol) and P1c(tBu) ($M_n$=11.7 kg/mol) are 86° C. and 88° C., respectively.

TABLE 2

Thermal Properties of the Polymers

| polymer | comment | $T_{5\%}$ (° C.)$^a$ | $T_{d1}$ (° C.)$^a$ | $T_{d2}$ (° C.)$^a$ | $T_g$ (° C.)$^b$ |
|---|---|---|---|---|---|
| P1a(Et) | entry 5 in Table 1 | 165 | 153 | 284 | 86 |
| P1b(nBu) | entry 6 in Table 1 | 170 | 166 | 292 | 56 |
| P1c(tBu) | entry 7 in Table 1 | 162 | 164 | 283 | 88 |
| P1d(nHex) | entry 8 in Table 1 | 168 | 165 | 293 | 28 |

$^a$Temperature of 5% mass loss ($T_{5\%}$) and decomposition temperature ($T_d$) were determined by thermal gravimetric analysis (TGA).
$^b$Glass transition temperature ($T_g$) was determined by differential scanning calorimetry (DSC).

Copolymerization Studies.

Figure 5:
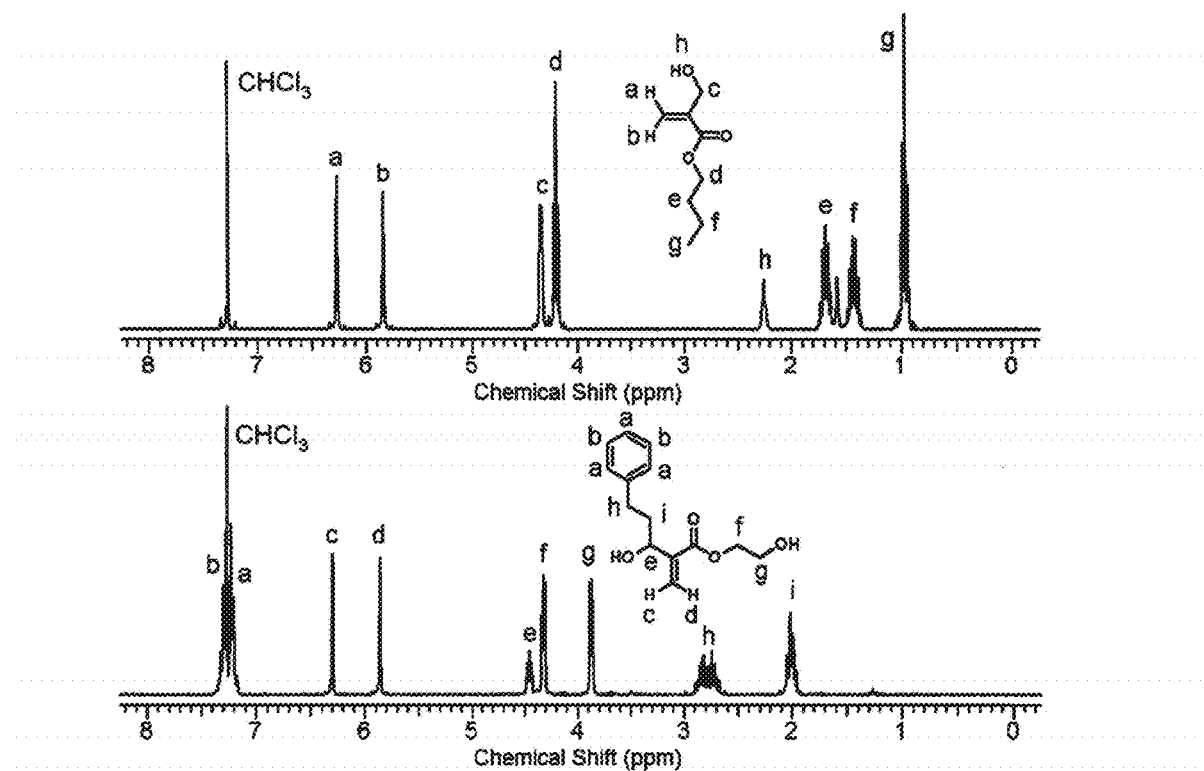
FIG. 5 provides an $^1$H NMR spectra of 1b(nBu) (top) and 2b(Ph) (bottom).
Figure 6:
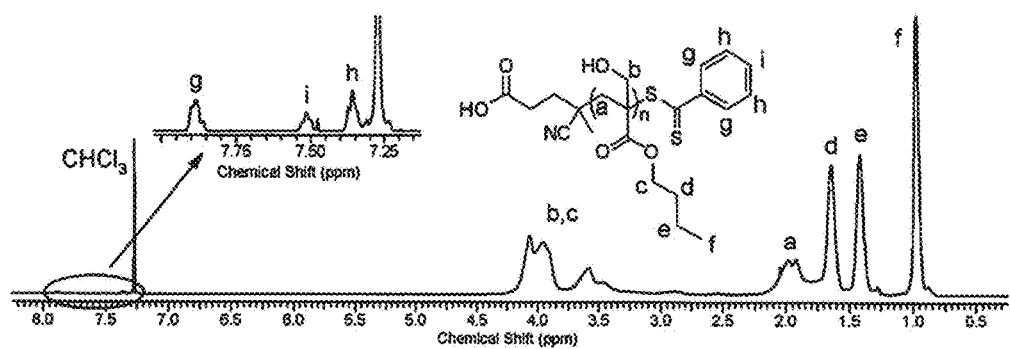
FIG. 6 provides an $^1$H NMR spectra of P1b(nBu) synthesized via RAFT polymerization.
Figure 7:
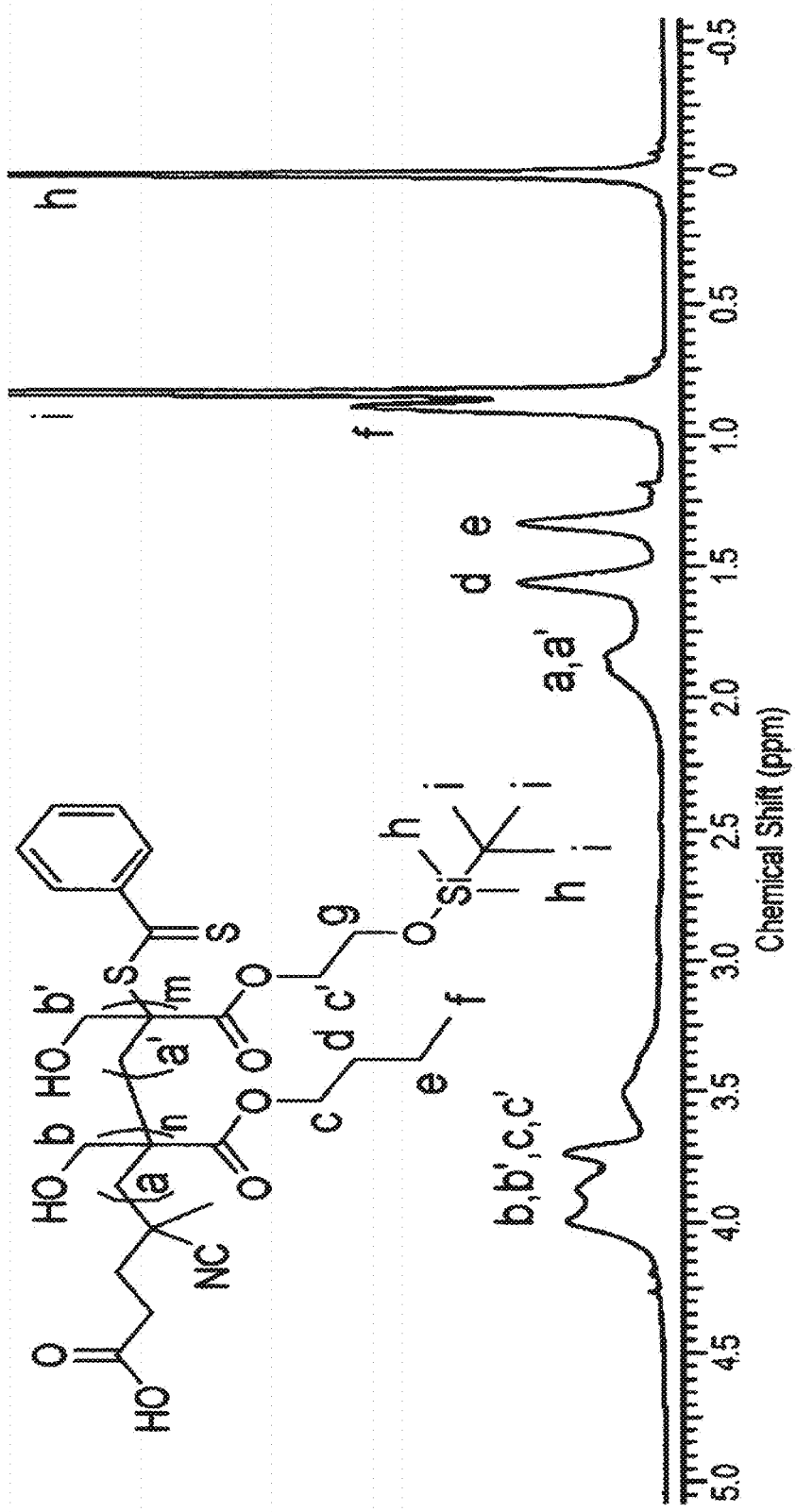
FIG. 7 provides an $^1$H NMR spectra of P1b(nBu)-b-P1e (TBS) synthesized via RAFT polymerization.
Figure 8:
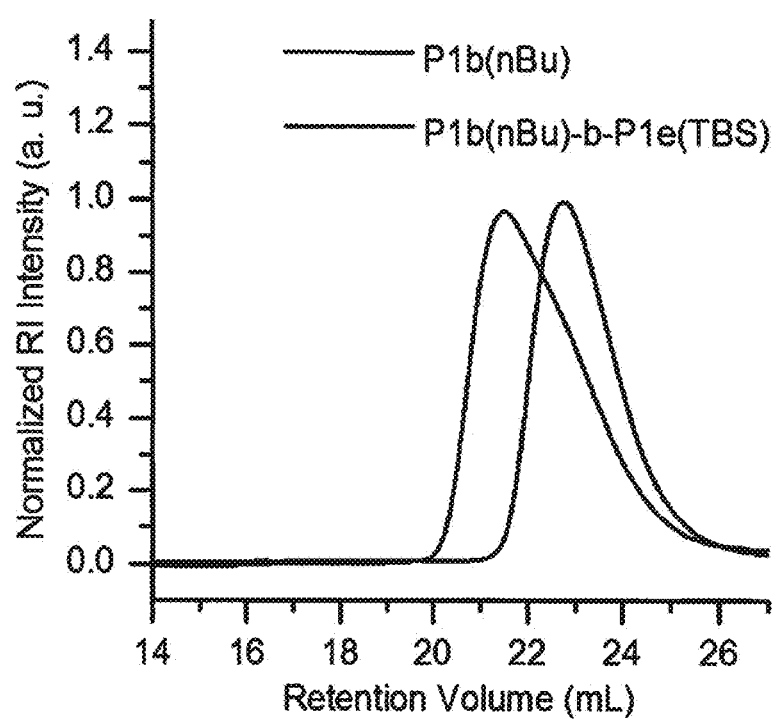
FIG. 8 provides a graph of an SEC traces of P1b(nBu) (entry 9 in Table 1) and P1b(nBu)-b-P1e(TBS) (entry 10 in Table 1).

In the previous section, we demonstrated successful RAFT polymerization of the alkyl α-hydroxymethyl acrylate monomers and confirmed the retained end-group functionality by 500 MHz $^1$H NMR spectroscopy. The homopolymer was subsequently tested as a macro-CTA to prepare block copolymers. To investigate this, we selected P1b(nBu) (entry 9 in Table 1, $M_n$=10.3 kg/mol, PDI=1.07) as the macro-CTA. In order to minimize the signal overlap of the two blocks in the $^1$H NMR spectra, the TBS (tert-butyldimethylsilyl) protected hydroxyl monomer, 1e(TBS), was selected for block copolymer synthesis as the difference in chemical shifts of the pendant groups corresponding to each block are easily distinguished in the $^1$H NMR spectra. The structure of the block copolymer, P1b(nBu)-b-P1e(TBS), was confirmed by $^1$H NMR spectroscopy (FIG. 4) The characteristic peaks of the second block (TBS group at 0.10 and 0.92 ppm) are observed as well as that of the first block (methyl group at 0.97 ppm). SEC analysis showed unimodal distribution for the homopolymer and block copolymer (FIG. 5). The first block P1b(nBu) ($M_n$=10.3 kg/mol, PDI=1.07) was successfully chain extended, as indicated by the distinct shift in the SEC retention volume. The polydispersity of the P1b(nBu)-b-P1e(TBS) ($M_n$=24.1 kg/mol, PDI=1.25) block copolymer increased slightly after chain extension but remained low, indicating good living character of the polymerization.

Preparation of Nanoparticles by Dialysis Method.

Figure 9:
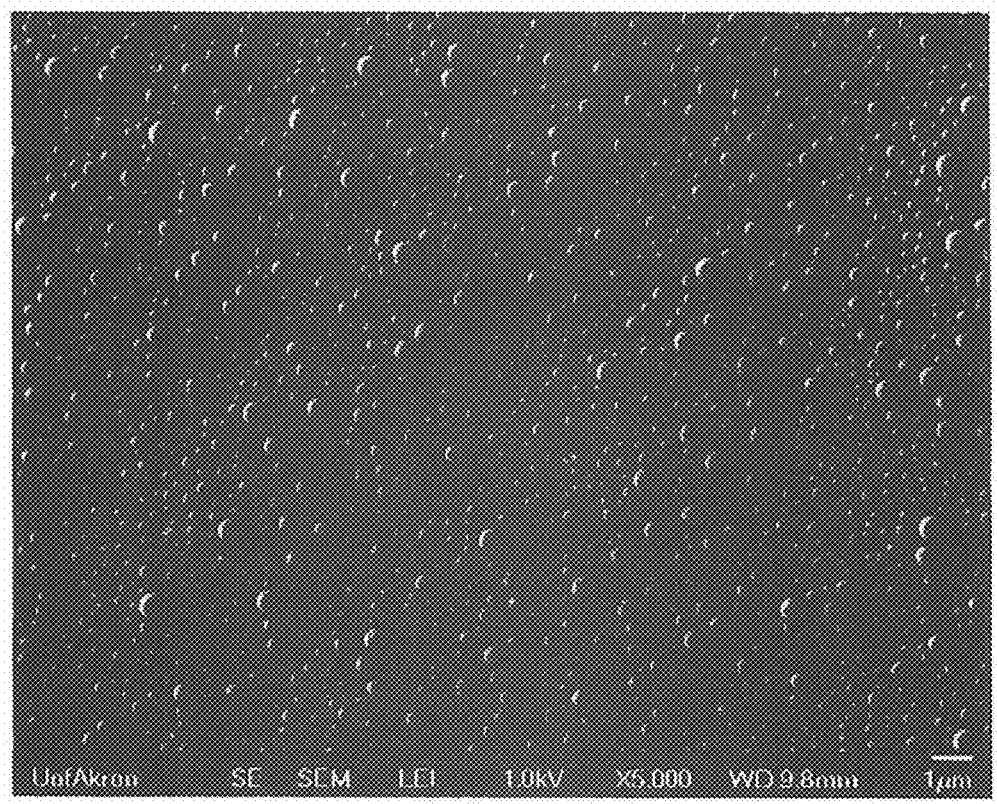
FIG. 9 provides an SEM images (without sputtering) of P1b(nBu) nanoparticles prepared by dialysis method; scale bar=1 μm.

The repeating unit of the described α-hydroxymethyl substituted polyacrylates is amphiphilic due to the presence of a hydrophilic hydroxyl group and a hydrophobic alkyl group. As a result, these amphiphilic polymers self-assemble into nanoparticles when dissolved in DMF and dialyzed against water. The SEM image (FIG. 9) of the nanoparticles prepared from P1b(nBu) ($M_n$=8.0 kg/mol, PDI=1.16) shows that the homopolymer forms well-defined spherical nanoparticles with an average diameter of 283 nm.

Figure 10:
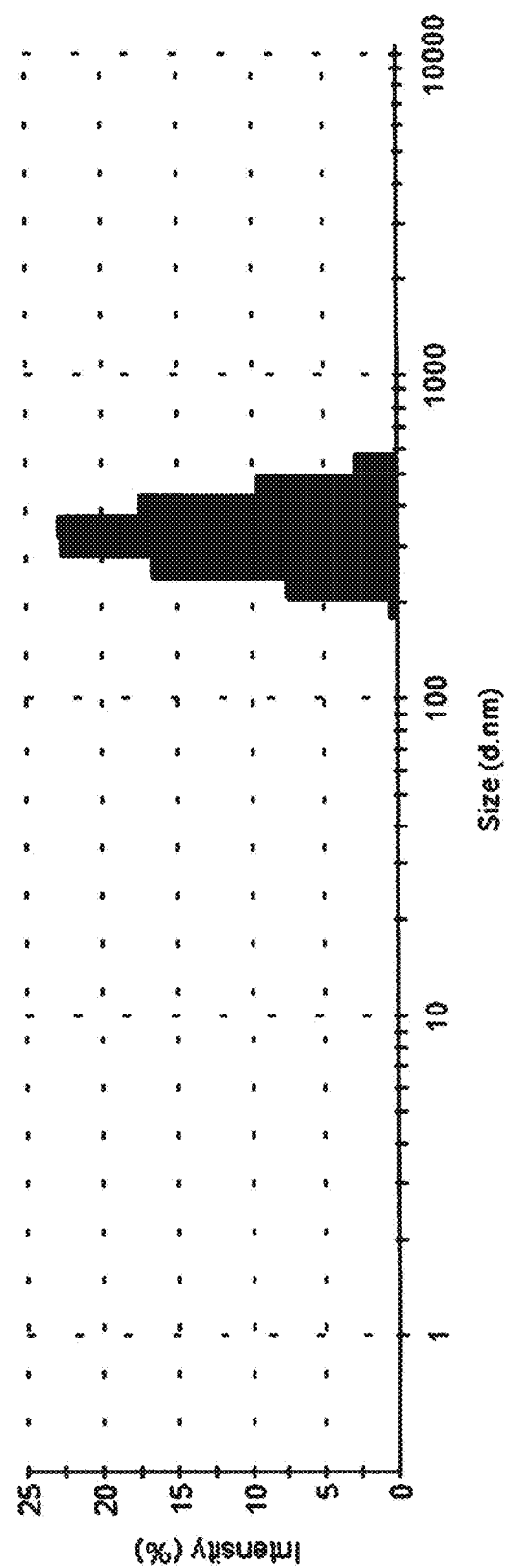
FIG. 10 provides a size distribution of P1b(nBu) nanoparticles prepared by dialysis method.

The average hydrodynamic diameter determined by DLS is 323 nm with a PDI of 0.18 (FIG. 10). The slight difference in reported size obtained from SEM and DLS analysis is probably due to nanoparticle swelling in the aqueous medium.

Preparation of Nanoparticles by the Dropping Method.

Self-assembly properties of P1b(nBu) was also investigated by the dropping method. In this experiment, P1b(nBu) ($M_n$=8.0 kg/mol, PDI=1.16) was initially dissolved in acetone at a concentration of 1 mg/mL and then an appropriate amount of water was added dropwise into the solution under vigorous stirring. It was observed that the polymer solution became faint blue after adding 15% water (weight fraction), which indicated self-assembly of the polymer. The SEM image (FIG. 11) shows the size of the obtained nanoparticles to be about 200 nm.

The above section described the chain polymerization of Baylis-Hillman monomers to provide homo and copolymers. In this section, the use of Baylis-Hillman based monomers for the synthesis of poly(ester-urethane)s and polyesters is described.

Synthesis of Functionalized Poly(ester urethane)s.

Step growth polymerization of the alkene-functionalized diol monomers with diisocyanates provided degradable poly (ester urethane)s. Two synthetic routes were explored for the synthesis of the poly(ester urethane)s (Scheme 5). The first involved the direct polymerization of the unsaturated diol followed by post-polymerization modification. The second involved the conjugate addition of thiols to the unsaturated diol prior to polymerization.

Direct Polymerization with Subsequent Post-Polymerization Functionalization.

Figure 14A:
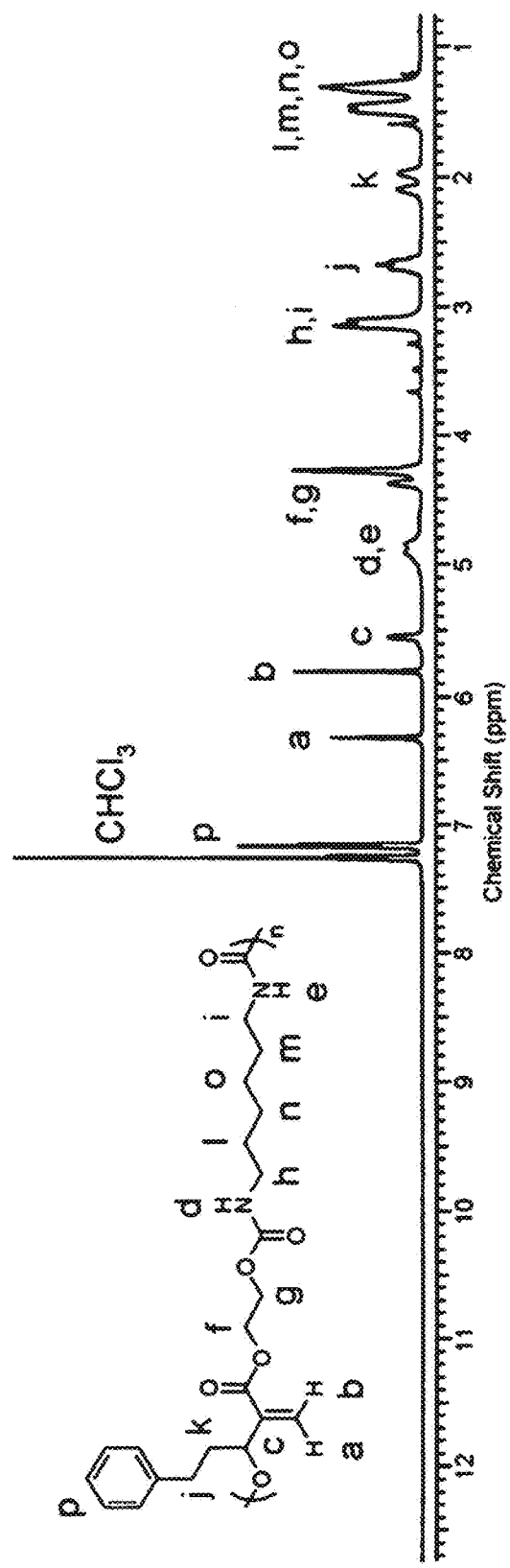
FIG. 14A provides an $^1$H NMR spectra of post-polymerization modification of PEU2b(Ph)).
Figure 14:
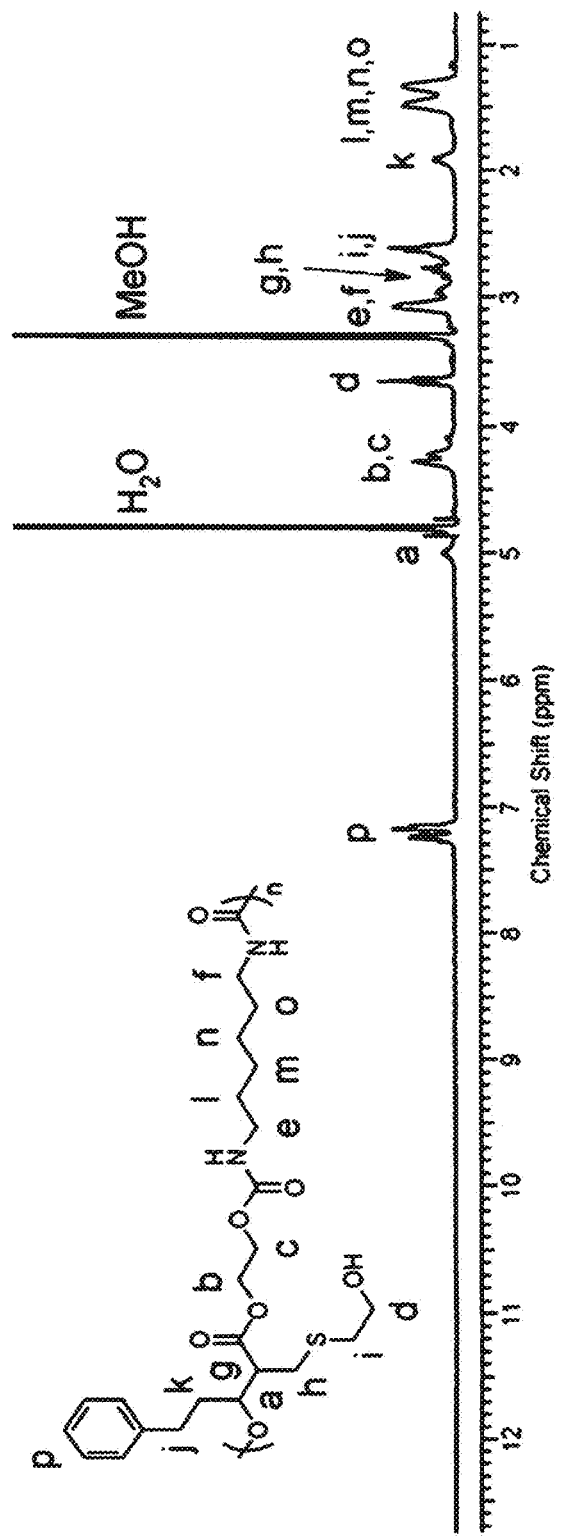
FIG. 14B provides an $^1$H NMR spectra of post-polymerization modification of PEU2b(Ph)-OH.
FIG. 14C provides an $^1$H NMR spectra of post-polymerization modification of PEU2b(Ph)-COOH.
Figure 14:
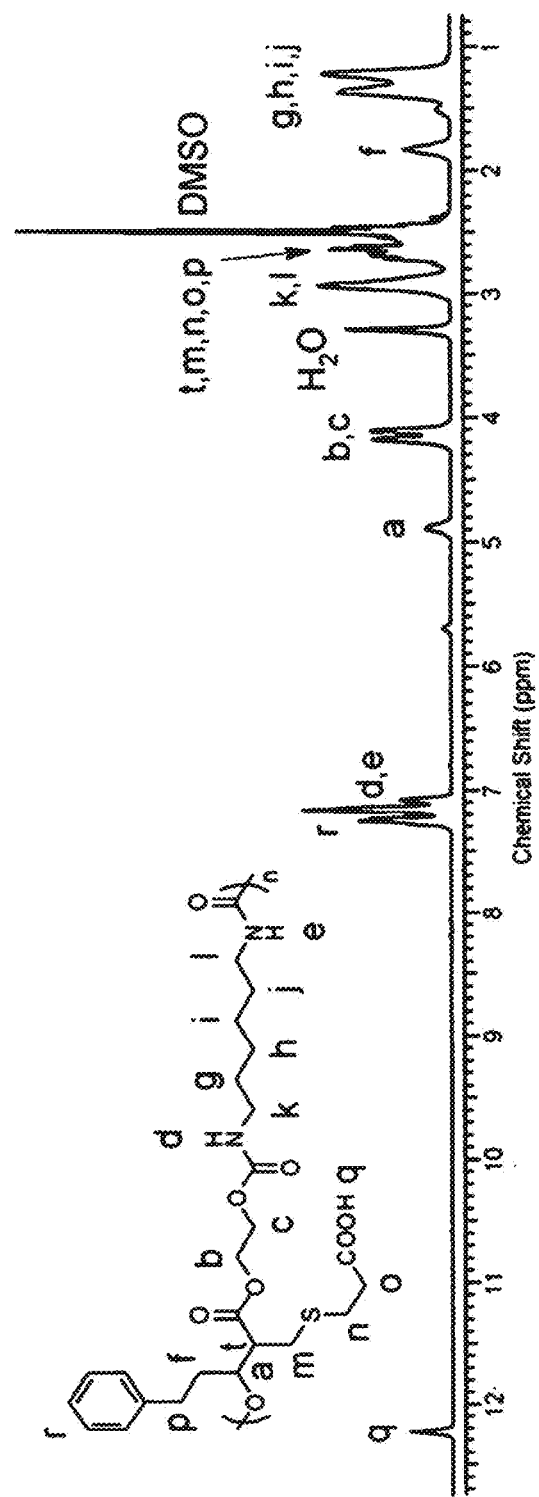
Figure 15:
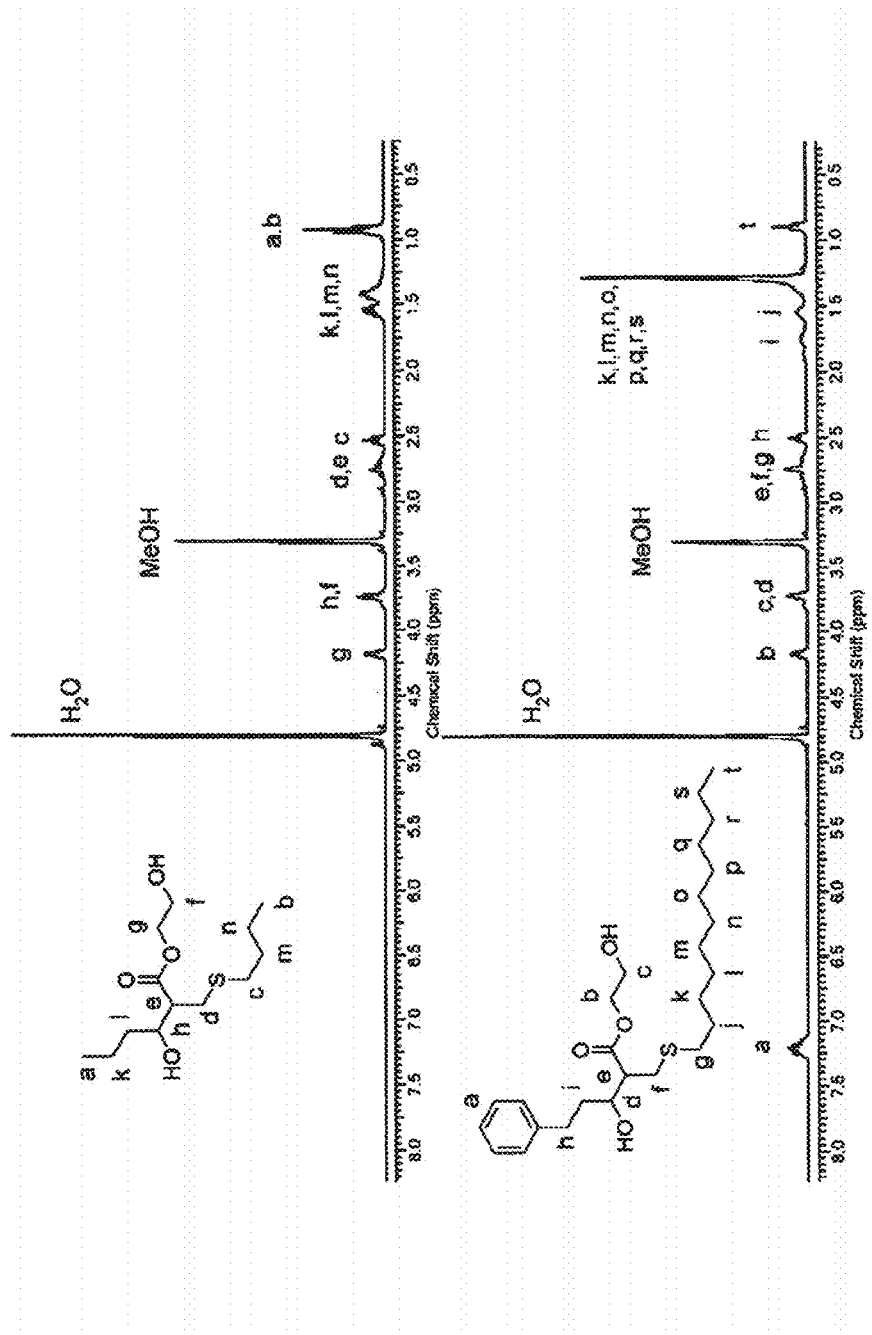
FIG. 15 provides the $^1$H NMR spectra of 2a(Pr)-nBu (top) and 2b(Ph)-Dodecyl (bottom).

The polymerization of unsaturated diols 2a(Pr) and 2b(Ph) with hexamethylene diisocyanate was achieved by solution polymerization in anhydrous CH2Cl2 at room temperature using Sn(Oct)2 as a catalyst. As shown in Table 3, polymerization of 2a(Pr) and 2b(Ph) afforded polymers with molecular weights of 6.2 and 9.4 kg/mol, respectively. The low molecular weight is probably a result of differential reactivity of the primary and secondary hydroxyl groups of the monomer. Evidence for the existence of the alkene group in PEU2b(Ph) is provided from the 1H NMR peaks at 5.81 and 6.32 ppm (FIG. 14). The alkene group can therefore be used for post-polymerization modification via thiol-ene click chemistry.

TABLE 3

Synthesis of Alkene-Functionalized Poly(ester urethane)s

| Entry | Polymer | Time (h) | $M_{n, SEC}$ (kg/mol)[a] | PDI[a] | $DP_n$[b] |
|---|---|---|---|---|---|
| 1 | PEU2a(Pr) | 24 | 6.2 | 1.46 | 35 |
| 2 | PEU2b(Ph) | 24 | 9.4 | 1.47 | 45 |

[a]Determined by SEC using DMF as the eluent and PS as the standard.
[b]Number-average degree of polymerization.

Post-polymerization Functionalization via Thiol-Ene "Click" Chemistry. The alkene pendant groups in the polymer can be converted to other functional groups via thiol-ene click chemistry. Functional groups which are potentially incompatible with the polymerization conditions such as hydroxyl or carboxyl groups can be incorporated into the polymers in high yields via post polymerization modification using thiol-ene chemistry. In this work, the reaction was carried out with 10 equivalents of functionalized thiol and 0.5 equivalents of photoinitiator (Irgacure 2959) in anhydrous CHCl$_3$. After irradiation at 350 nm for 30 minutes, the excess thiol was removed by precipitation in diethyl ether.

TABLE 4

Post-Polymerization Modification of Poly(ester urethane)s

| entry | polymer | thiol | Time (min) | Conversion (%) |
|---|---|---|---|---|
| 1 | PEU2a(Pr) | HSCH$_2$CH$_2$OH | 30 | 100 |
| 2 | PEU2a(Pr) | HSCH$_2$CH$_2$COOH | 30 | 100 |
| 3 | PEU2b(Ph) | HSCH$_2$CH$_2$OH | 30 | 100 |
| 4 | PEU2b(Ph) | HSCH$_2$CH$_2$COOH | 30 | 100 |

As a proof-of-concept, the post-polymerization modification of PEU2b(Ph) with 2-mercaptoethanol and 3-mercaptopropionic acid was investigated. The conjugate addition of the thiol to the unsaturated polymers was confirmed by 1H NMR spectroscopy. FIG. 14 shows the appearance of new signals consistent with the corresponding functional groups. Additionally, the characteristic peaks of the alkene groups in the $^1$H NMR spectra have completely disappeared after the thiol-ene reaction, which indicates quantitative conversion of the alkene groups (Table 4). The glass transition temperatures (Tg) of the functionalized polymers were determined by DSC (Table 5). The addition of polar functional groups such as hydroxyl and carboxyl groups leads to an increase in the glass transition temperature. The Tg of PEU2b(Ph)-OH is 21° C. as compared to 8° C. for the polymer before functionalization. The Tg of PEU2b(Ph)-COOH is 22° C.

TABLE 5

Thermal Properties of Post-Functionalized Poly(ester urethane)s

| Polymer | $T_{5\%}$ (° C.)[a] | $T_d$ (° C.)[a] | $T_g$ (° C.)[b] |
|---|---|---|---|
| PEU2a(Pr) | 147 | 142 | 5 |
| PEU2a(Pr)—OH | 187 | 186 | 16 |
| PEU2a(Pr)—COOH | 206 | 207 | 21 |
| PEU2b(Ph) | 190 | 166 | 9 |
| PEU2b(Ph)—OH | 201 | 199 | 21 |
| PEU2b(Ph)—COOH | 205 | 210 | 22 |

[a]Temperature of 5% mass loss ($T_{5\%}$) and decomposition temperature ($T_d$) were determined by thermal gravimetric analysis (TGA).
[b]Glass transition temperature ($T_g$) was determined by differential scanning calorimetry (DSC).

Pre-functionalization and Subsequent Polymerization of Functionalized Monomers. An alternative approach to provide functionalized degradable polymers is the conjugate addition of thiols to the unsaturated diols prior to polymerization. As a proof-of-concept, the thiol-ene reactions of 2a(Pr) with 1-butanethiol and 2b(Ph) with 1-dodecanethiol were investigated. The conjugate addition of thiols to the unsaturated diol was carried out by irradiation at 350 nm for 30 minutes in the presence of Irgacure 2959. The $^1$H NMR spectra of the pre-functionalized diol monomers are shown in FIG. 10.

Figure 11:
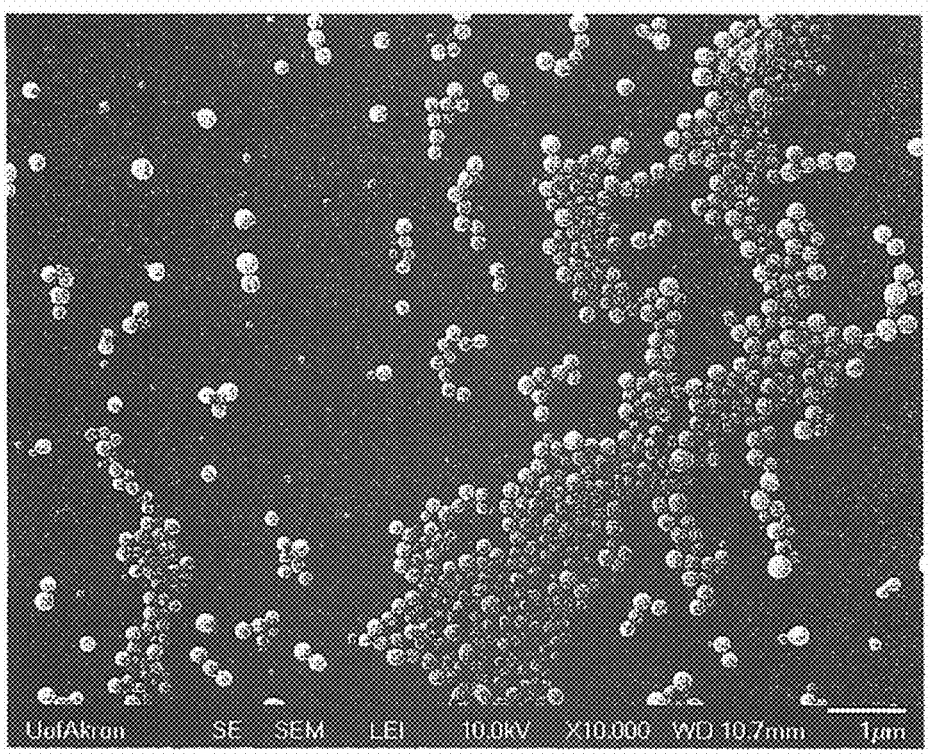
FIG. 11 provides an SEM image (with sputtering) of P1b(nBu) nanoparticles prepared by the dropping method; scale bar=1 μm FIG. 12 provides a scheme for the synthesis of functionalized poly(ester urethane)s FIG. 13 provides a scheme for the synthesis of functionalized polyesters.
Figure 12:
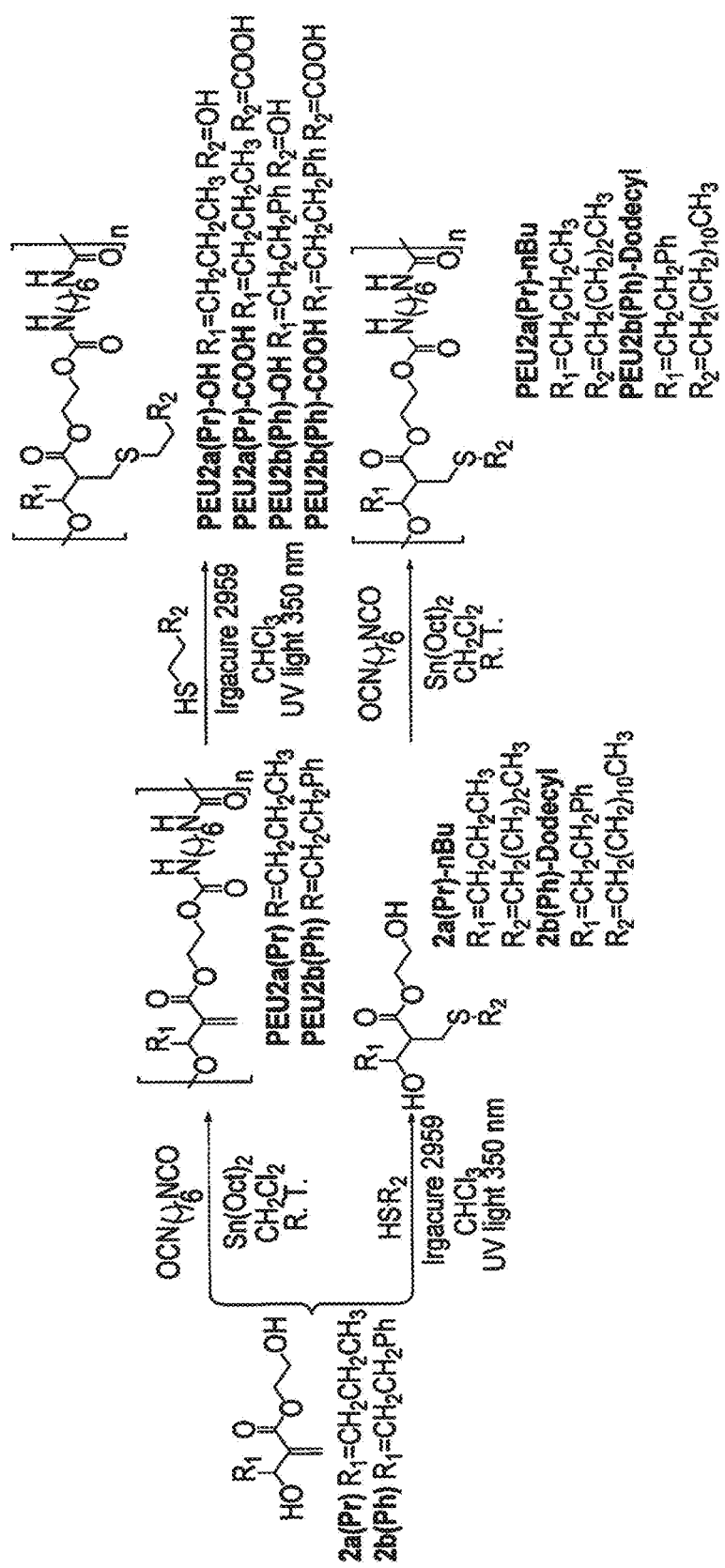

The pre-functionalized diol monomers can be used to synthesize poly(ester urethane)s by copolymerizing with hexamethylene diisocyanate using Sn(Oct)2 as catalyst. However, for the pre-functionalization method, the degree of polymerization (DPn) of the poly(ester urethane) was much lower (average of 16) (Table 6) compared to that for the post-functionalization method (average of 40). This relatively low efficiency is probably the result of increased steric hindrance present in the functionalized diol monomers. The chemical structure of the poly(ester urethane)s was characterized by 1H NMR spectroscopy (FIG. 11).

TABLE 6

Synthesis of Pre-Functionalized Polyesters and Poly(ester urethane)s

| entry | polymer | Time (h) | $M_{n, SEC}$ (kg/mol)[a] | PDI[a] | $DP_n$[b] |
|---|---|---|---|---|---|
| 1 | PE2a(Pr)—nBu | 48 | 11.8 | 1.16 | 60 |
| 2 | PE2b(Ph)-Dodecyl | 48 | 8.3 | 1.34 | 29 |
| 3 | PEU2a(Pr)—nBu | 24 | 3.5 | 1.61 | 16 |
| 4 | PEU2b(Ph)-Dodecyl | 24 | 5.2 | 1.66 | 17 |

[a]Determined by SEC using DMF as the eluent and PS as the standard.
[b]Number-average degree of polymerization.

Figure 13:
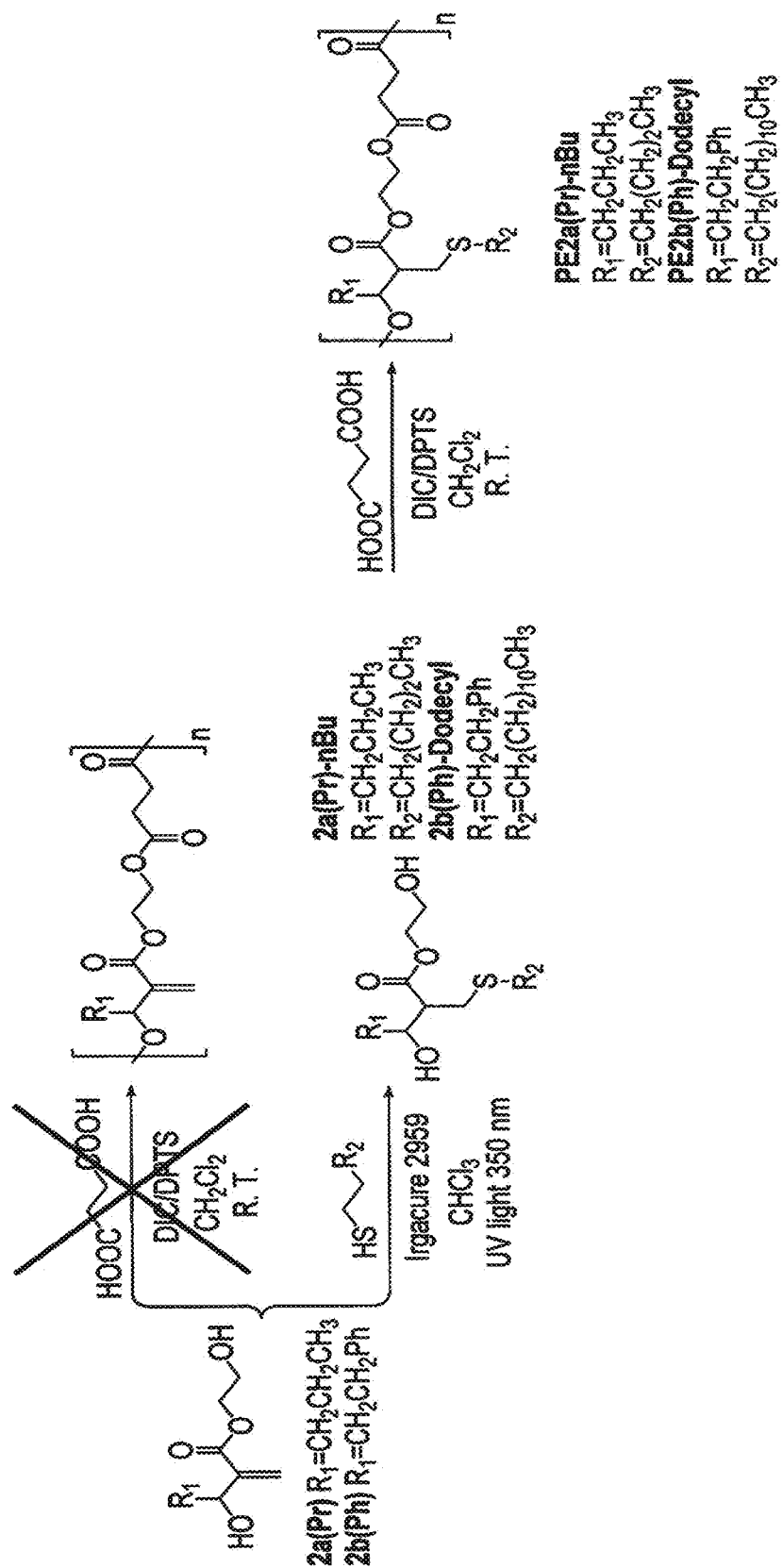
Figure 16A:
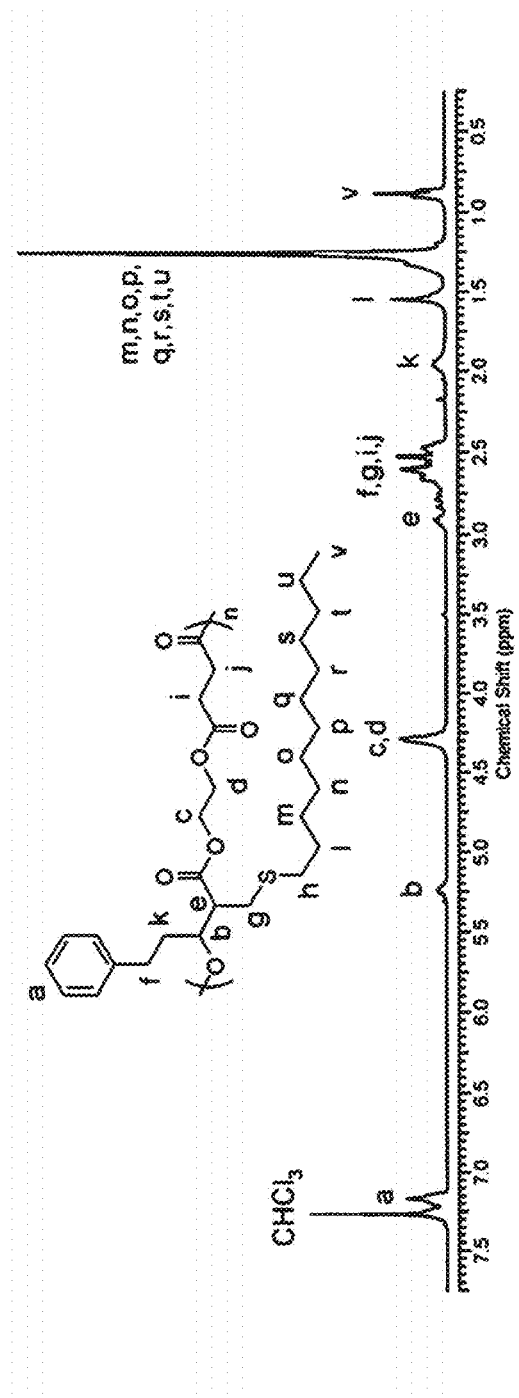
FIG. 16A provides the $^1$H NMR spectra of PE2a(Ph)-Dodecyl.
Figure 16:
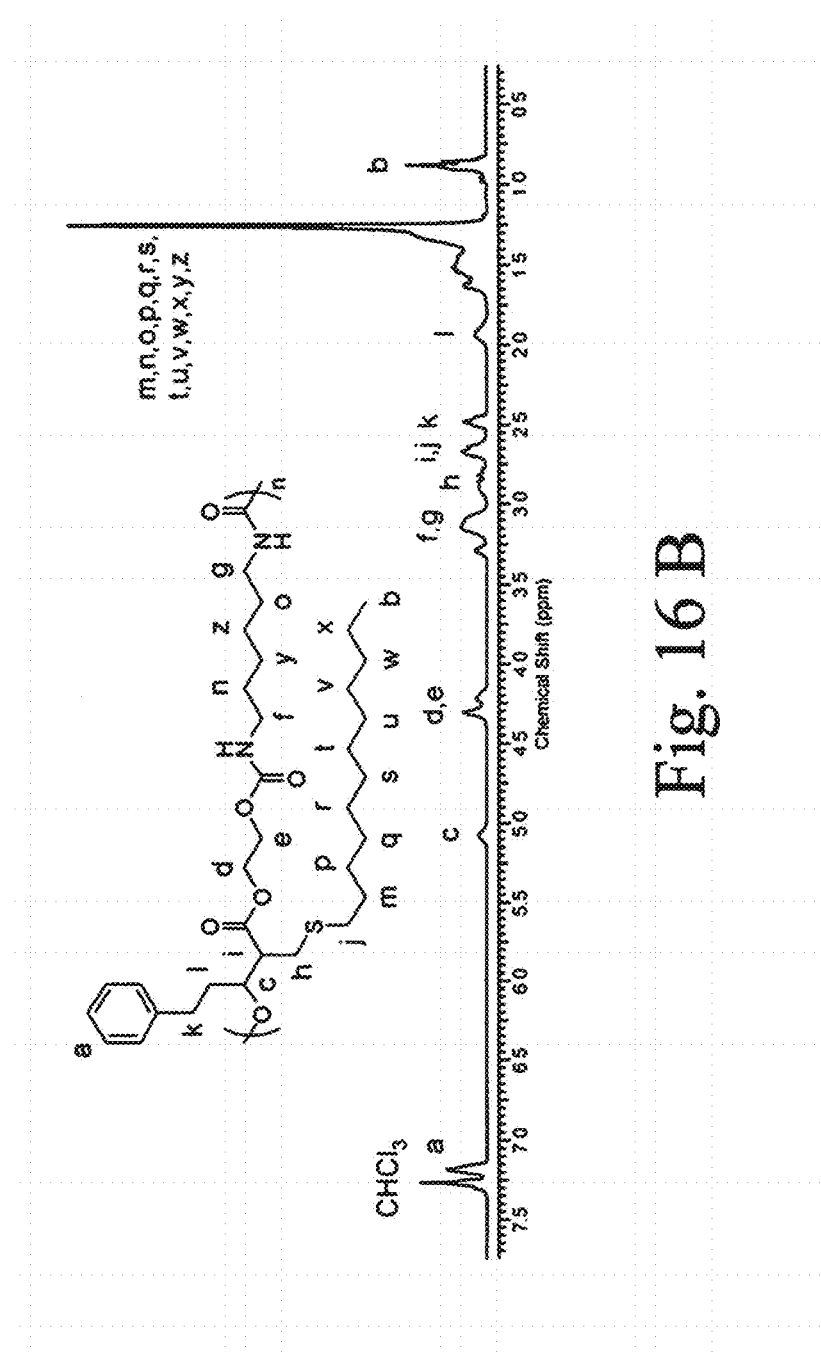
FIG. 16B provides the $^1$H NMR spectra of PEU2b(Ph)-Dodecyl.

Synthesis of Functionalized Polyesters. The synthesis of unsaturated polyesters was problematic due to the high reactivity of the alkene groups. Our attempts, including Sn(Oct)2 catalyzed melt polycondensation and DIC/DPTS-mediated polycondensation, were unsuccessful, which afforded cross-linked polymers that did not dissolve in common organic solvents such as chloroform, THF, or DMF. Contrary to the unsaturated diol monomers, the pre-functionalized diol monomers can undergo step-growth polymerization with succinic acid under carbodiimide mediated conditions to provide the corresponding polyesters (FIG. 13). The resultant polyester had a moderate molecular weight of 11.8 kg/mol for PE2a(Pr)-nBu and 8.3 kg/mol for PE2b(Ph)-Dodecyl (Table 6). The chemical structure of the polyester was characterized by $^1$H NMR spectroscopy (FIG. 16).

What is claimed is:

1. A method of preparing a polymer comprising:
preparing a diol functionalized Baylis-Hillman adduct by performing a Baylis-Hillman reaction on an activated alkene and a carbon electrophile, and polymerizing the diol functionalized Baylis-Hillman adduct through a step-growth polymerization to produce a polymer defined by the formula:

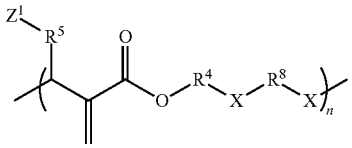

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; each X is an ester or urethane group; and n is about 10 to 100 units; or a polymer defined by the formula:

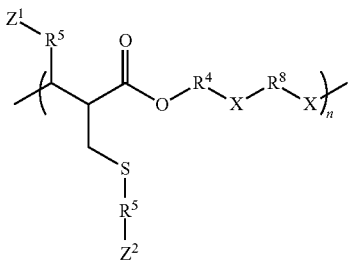

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; and $Z^2$ is a hydrogen atom, aryl group, protected amine, protected carboxylic acid, alkoxy, silyloxy, hydroxyl, protected diol, amine, carboxylic acid, or diol; each X is an ester or urethane group; and n is about 10 to 100.

2. The method of claim 1, where the activated alkene is defined by the formula:

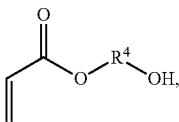

and the carbon electrophile is defined by the formula

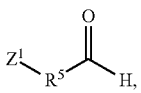

where $R^4$ is a hydrocarbon group; $R^5$ is a bond or a hydrocarbon group; and $Z^1$ is hydrogen, protected amine, protected carboxylic acid, protected hydroxyl, alkoxy, or silyloxy group.

3. The method of claim 1, where the step-growth polymerization prepares a polyurethane by reacting a diisocyanate and the Baylis-Hillman adduct.

4. The method of claim 3, where the diisocyante may be defined by the formula:

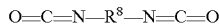

where $R^8$ is a hydrocarbon group.

5. The method of claim 3, where the diol functionalized Baylis-Hillman adduct is modified prior to polymerization through a reaction with a thiol compound to provide a diol functionalized Baylis-Hillman adduct defined by the formula:

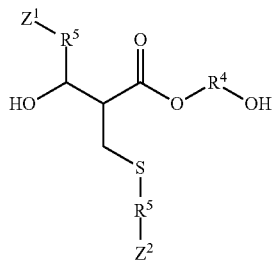

where $R^4$ is a hydrocarbon groups; each $R^5$ is independently a bond or a hydrocarbon group; $Z^1$ is hydrogen, protected amine, protected carboxylic acid, protected hydroxyl, alkoxy, or silyloxy group; and $Z^2$ is a hydrogen atom, protected amine, protected carboxylic acid, alkoxy, or silyloxy, hydroxyl group, protected diol or aryl group.

6. The method of claim 3, where the diol functionalized Baylis-Hillman adduct is defined by the formula:

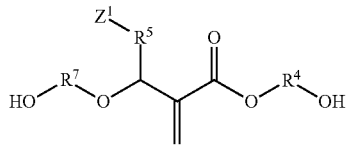

where $R^4$ is a hydrocarbon group; $R^5$ is a bond or a hydrocarbon group; and $Z^1$ is hydrogen, protected amine, protected carboxylic acid, protected hydroxyl, alkoxy, or silyloxy group.

7. The method of claim 6, where the polymer is modified post-polymerization by a thiol-ene reaction.

8. The method of claim 7, where the thiol-ene reaction is preformed with a thiol compound defined by the formula:

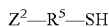

where $R^5$ is independently a bond or a hydrocarbon group, and $Z^2$ is a hydrogen atom, aryl group, protected amine, protected carboxylic acid, alkoxy, silyloxy, hydroxyl, protected diol, amine, carboxylic acid, or diol.

9. The method of claim 1, where diol functional Baylis-Hillman adduct is first modified prior to polymerization through the addition of a functional group through a thiol-ene reaction, and the step-growth polymerization prepares polyester by reacting a dicarboxylic acid and the Baylis-Hillman adduct.

10. The method of claim 9, the dicarboxylic acid is defined by the formula:

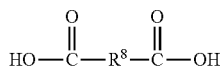

where $R^8$ is a hydrocarbon group.

11. The method of claim 9, where thiol-modified diol functionalized Baylis-Hillman is defined by the formula:

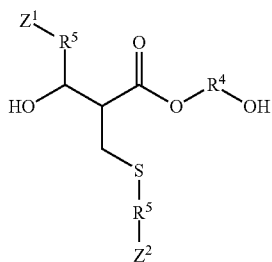

where $R^4$ is a hydrocarbon groups; each $R^5$ is independently a bond or a hydrocarbon group; $Z^1$ is hydrogen, protected amine, protected carboxylic acid, protected hydroxyl, alkoxy, or silyloxy group; and $Z^2$ is a hydrogen atom, protected amine, protected carboxylic acid, alkoxy, or silyloxy, hydroxyl group, protected diol or aryl group.

12. A polymer defined by the formula:

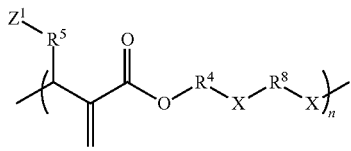

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; each X is an ester or urethane group; and n is about 10 to 100 units.

13. The polymer of claim 12, where each X is an ester group.

14. The polymer of claim 12, where each X is a urethane group.

15. A polymer defined by the formula:

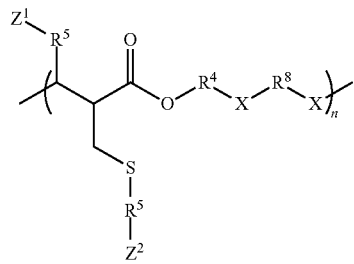

where $R^4$ and $R^8$ are each independently hydrocarbon groups; $R^5$ is a bond or a hydrocarbon group; $Z^1$ is hydrogen, protected amine, protected carboxylic acid, protected hydroxyl, alkoxy, or silyloxy group; and $Z^2$ is a hydrogen atom, aryl group, protected amine, protected carboxylic acid, alkoxy, silyloxy, hydroxyl, protected diol, amine, carboxylic acid, or diol; each X is an ester or urethane group; and n is about 10 to 100.

16. The polymer of claim 15, where each X is a urethane group.

* * * * *